(12) United States Patent
Norris

(10) Patent No.: US 12,650,286 B2
(45) Date of Patent: Jun. 9, 2026

(54) SPIN-STABILIZED STEERABLE PROJECTILE CONTROL

(71) Applicant: BAE SYSTEMS plc, London (GB)

(72) Inventor: James Joshua Norris, Swindon (GB)

(73) Assignee: BAE SYSTEMS PLC, London (GB)

( * ) Notice: Subject to any disclaimer, the term of this patent is extended or adjusted under 35 U.S.C. 154(b) by 481 days.

(21) Appl. No.: 18/557,758

(22) PCT Filed: Apr. 19, 2022

(86) PCT No.: PCT/GB2022/050970
§ 371 (c)(1),
(2) Date: Oct. 27, 2023

(87) PCT Pub. No.: WO2022/229593
PCT Pub. Date: Nov. 3, 2022

(65) Prior Publication Data
US 2024/0280352 A1 Aug. 22, 2024

(30) Foreign Application Priority Data

Apr. 28, 2021 (GB) ..................................... 2106035

(51) Int. Cl.
F42B 10/60 (2006.01)
F42B 10/26 (2006.01)
(Continued)

(52) U.S. Cl.
CPC .............. F42B 10/60 (2013.01); F42B 10/26 (2013.01); G05D 1/461 (2024.01); G06N 3/045 (2023.01);
(Continued)

(58) Field of Classification Search
CPC ......... F42B 10/60; F42B 10/26; G05D 1/461; G05D 2101/15; G05D 2105/35;
(Continued)

(56) References Cited

U.S. PATENT DOCUMENTS 5,478,028 A * 12/1995 Snyder ................... F41G 7/305
244/3.22
9,857,154 B2 1/2018 Minnicino, II
(Continued)

FOREIGN PATENT DOCUMENTS

| CN | 112729024 A | 4/2021 |
| WO | 2017072764 A1 | 5/2017 |
| WO | 2022229593 A1 | 11/2022 |

OTHER PUBLICATIONS

International Search Report and Written Opinion received for PCT/GB2022/050970. Mailed: Jul. 4, 2022. 8 pages.
(Continued)

*Primary Examiner* — Tung T Vo
(74) *Attorney, Agent, or Firm* — Arcane Law PLLC

(57) ABSTRACT
A computer-implemented method of training a machine learning, ML algorithm to control spin-stabilized steerable projectiles is described. The method comprises: obtaining training data including respective policies and corresponding trajectories of a set of spin-stabilized steerable projectiles including a first projectile, wherein each policy relates to steering a projectile of the set thereof towards a target and wherein each corresponding trajectory comprises a series of states in a state space of the projectile (S2001); and training the ML algorithm comprising determining relationships between the respective policies and corresponding trajectories of the projectiles of the set thereof based on respective results of comparing the trajectories and the targets (S2002).

20 Claims, 15 Drawing Sheets

(51) Int. Cl.

| | |
|---|---|
| *G05D 1/461* | (2024.01) |
| *G06N 3/045* | (2023.01) |
| *G06N 3/092* | (2023.01) |
| *G06N 20/00* | (2019.01) |
| *G05D 101/15* | (2024.01) |
| *G05D 105/35* | (2024.01) |
| *G05D 109/20* | (2024.01) |

(52) U.S. Cl.
CPC ............. *G06N 3/092* (2023.01); *G06N 20/00* (2019.01); *G05D 2101/15* (2024.01); *G05D 2105/35* (2024.01); *G05D 2109/29* (2024.01)

(58) Field of Classification Search
CPC .... G05D 2109/29; G05D 1/108; G06N 3/045; G06N 3/092; G06N 20/00; G06N 3/0499; G06N 3/08; G06N 3/094; F41G 7/305
USPC .......................................................... 706/12
See application file for complete search history.

(56) References Cited

U.S. PATENT DOCUMENTS

| | | | |
|---|---|---|---|
| 11,555,679 B1* | 1/2023 | McLoughlin ......... | F42C 11/008 |
| 11,573,069 B1* | 2/2023 | Parrow ................. | F42C 11/008 |
| 12,345,513 B1* | 7/2025 | Sowle .................... | F42B 10/00 |
| 2012/0256038 A1* | 10/2012 | Elwell, Jr. .............. | F42B 15/01 |
| | | | 244/3.2 |
| 2019/0323807 A1* | 10/2019 | Smith .................. | G01S 5/0246 |
| 2023/0228546 A1* | 7/2023 | Norris .................... | F42B 10/46 |
| | | | 244/3.15 |

OTHER PUBLICATIONS

GB Search Report under Section 17(5) received for GB Application No. 2106035.5, dated Oct. 22, 2021. 4 pages.

Zhang, et al., "Missile-Target Situation Assessment Model Based on Reinforcement Learning," Journal of Shanghai Jiaotong University, Shanghai Jiaotong University Press, vol. 25, No. 5 (Jul. 31, 2020) pp. 561-568.

* cited by examiner

Reward $r$

RL agent

RL Algorithm

Policy $\pi(\alpha \backslash s)$

Action $\alpha$

Environment

'Observations'

State $s$

DQN agent

Reward $r$

Actor network

Critic network

State $s$

'Policy' $\pi(\alpha|s)$ $Q(\alpha)$   Action $\alpha$

Section A-A

```
┌─────────────────────┐
│       S2101         │
└─────────────────────┘
```

SPIN-STABILIZED STEERABLE PROJECTILE CONTROL

The present invention relates to spin-stabilized steerable projectiles and controlling spin-stabilized steerable projectiles.

Conventional guided projectiles are used as precision strike weapons for high value targets, typically using external protruding control surfaces or thrust vectoring for steering. The most prevalent means of steering a guided projectile is via use of a protruding control surface into an airflow to alter a roll angle of the projectile in combination with exerting a control force on the projectile by actuating the control surface. This is achieved by rolling the projectile to align the controllable pitch axis with the desired direction and actuating the control surface, thereby exerting the control force which results in lateral movement of the projectile, thus steering the projectile in flight. Alternatively, steering may be achieved using a dual spin arrangement wherein forward and aft sections of a projectile are spun relative to each other via a suitable mechanism in order to align the controllable pitch axis into the desired angle, for example as used in Silver Bullet™ (BAE Systems) and STARStreak® (Thales).

Small calibre projectiles suffer a trade-off between internal volume required for control and guidance hardware versus propellant, charge and/or explosive volume.

There is a need to reduce a spatial volume and/or mass of guidance and/or control hardware within projectiles in order to increase volumes and/or masses of propellant, charge, explosives, and/or sensors to increase the endurance, range and lethality of projectiles, for example small calibre projectiles. There is a need to improve an accuracy and/or precision of projectiles, for example small calibre projectiles.

It is an example aim of the present invention to at least partially solve or avoid one or more problems or disadvantages with guided projectiles, whether identified herein or elsewhere, namely that of steering projectiles without the use of protruding external fins.

SUMMARY OF THE INVENTION

It is one aim of the present invention, amongst others, to provide a spin-stabilized steerable projectile and a method of controlling a spin-stabilized steerable projectile which at least partially obviates or mitigates at least some of the disadvantages of the prior art, whether identified herein or elsewhere. For instance, it is an aim of embodiments of the invention to provide a method of training a machine learning, ML algorithm, for example a reinforcement learning, RL, agent and a trained ML algorithm, for example a trained RL agent, that improves an accuracy and/or precision of projectiles by improving control, for example steering, thereof.

A first aspect provides a computer-implemented method of training a machine learning, ML algorithm to control spin-stabilized steerable projectiles, the method comprising:

obtaining training data including respective policies and corresponding trajectories of a set of spin-stabilized steerable projectiles including a first projectile, wherein each policy relates to steering a projectile of the set thereof towards a target and wherein each corresponding trajectory comprises a series of states in a state space of the projectile; and training the ML algorithm comprising determining relationships between the respective policies and corresponding trajectories of the projectiles of the set thereof based on respective results of comparing the trajectories and the targets.

A second aspect provides a computer-implemented method of controlling a spin-stabilized steerable projectile, the method:

controlling, by a trained machine learning, ML, algorithm, the projectile according to a policy, comprising steering the projectile towards a target.

A third aspect provides a computer-implemented method of training a reinforcement learning, RL, agent to control spin-stabilized steerable projectiles, the method comprising steps of:

(a) actioning, by the agent, a spin-stabilized steerable projectile according to a policy of an action space of the agent, comprising steering the projectile towards a target, thereby defining a corresponding trajectory comprising a series of states in a state space of the projectile;

(b) updating the policy based on a result of comparing the trajectory and the target; and (c) repeating steps (a) and (b), using the updated policy.

A fourth aspect provides a computer-implemented method of controlling a spin-stabilized steerable projectile, the method comprising steps of:

controlling, by a trained reinforcement learning, RL, agent, the projectile according to a policy of an action space of the agent, comprising steering the projectile towards a target.

A fifth aspect provides a projectile comprising a front ogive section, an aft section and a command module communicable with a trained machine learning, ML, algorithm;

wherein the front ogive section is rotatably connected to the aft section by a coupling device and wherein the front ogive section comprises an asymmetric surface;

wherein angular rotation of the front ogive section is selectively adjustable relative to the aft section by commands from the command module, responsive to the trained ML algorithm, to the coupling device, whereby the asymmetric surface exerts an imbalance upon the projectile to control the trajectory of said projectile.

A sixth aspect provides a system comprising a projectile according to the fifth aspect and a computer, comprising a processor and a memory, comprising a trained machine learning, ML, algorithm communicable therewith.

A seventh aspect provides a computer comprising a processor and a memory configured to implement a method according to the first aspect, the second aspect, the third aspect or the fourth aspect.

An eighth aspect provides a computer program comprising instructions which, when executed by a computer comprising a processor and a memory, cause the computer to perform a method according to the first aspect, the second aspect, the third aspect or the fourth aspect.

A ninth aspect provides a non-transient computer-readable storage medium comprising instructions which, when executed by a computer comprising a processor and a memory, cause the computer to perform a method according to the first aspect, the second aspect, the third aspect or the fourth aspect.

A tenth aspect provides a machine learning, ML, algorithm trained according to the method according to the first aspect or a reinforcement learning, RL, agent trained according to the method according to the third aspect.

DETAILED DESCRIPTION OF THE INVENTION

According to the present invention there is provided a computer-implemented method of training a machine learning, ML, algorithm to control spin-stabilized steerable projectiles, as set forth in the appended claims. Also provided is a method of controlling a spin-stabilized steerable projectile, a spin-stabilized steerable projectile, a system comprising a spin-stabilized steerable projectile, a computer, a computer program, a non-transient computer-readable storage medium and a trained ML algorithm. Other features of the invention will be apparent from the dependent claims, and the description that follows.

Training ML Algorithm to Control Spin-Stabilized Steerable Projectiles

The first aspect provides a computer-implemented method of training a machine learning, ML algorithm to control spin-stabilized steerable projectiles, the method comprising:

obtaining training data including respective policies and corresponding trajectories of a set of spin-stabilized steerable projectiles including a first projectile, wherein each policy relates to steering a projectile of the set thereof towards a target and wherein each corresponding trajectory comprises a series of states in a state space of the projectile; and training the ML algorithm comprising determining relationships between the respective policies and corresponding trajectories of the projectiles of the set thereof based on respective results of comparing the trajectories and the targets.

In this way, the ML algorithm is trained to control spin-stabilized steerable projectiles by determining the relationships between the respective policies and corresponding trajectories of the projectiles, thereby improving an accuracy and/or precision of the projectiles controlled, for example steered, by the trained ML algorithm.

Method

The method is of training the ML algorithm, for example a reinforcement learning, RL, agent, as described below, to control spin-stabilized steerable projectiles.

Spin-Stabilized Projectile

Generally, two methods may be employed to stabilize non-spherical projectiles during flight: projectiles like arrows or arrow like sabots achieve stability by forcing their centre of pressure (CP) behind their centre of mass (CM) with tail surfaces, resulting in stable projectile flight, meaning the projectile will not overturn during flight through the atmosphere due to aerodynamic forces; or projectiles such as small arms bullets and artillery shells must overcome a destabilizing overturning torque due to the CP being in front of the CM. To stabilize such a projectile, the projectile is spun around its longitudinal (leading to trailing) axis, resulting in gyroscopic forces that keep the projectile's longitudinal axis resistant to the destabilizing overturning torque i.e. a spin stabilized projectile.

It should be understood that controlling spin-stabilized steerable projectiles is without use of protruding external fins, for example. In contrast to conventional non-spin-stabilized steerable projectiles controlled using protruding external fins, spin-stabilized steerable projectiles may be steered by exerting an imbalanced force thereupon by deflection of oncoming airflow, while maintaining the spin-stabilization, as described below in more detail.

In one example, controlling the spin-stabilized steerable projectiles comprises and/or is steering the spin-stabilized steerable projectiles, as described herein.

In one example, the spin-stabilized steerable projectiles are as described with respect to the fifth aspect.

ML Algorithm

In one example, the ML algorithm comprises and/or is a reinforcement learning, RL, algorithm, for example a model-based RL algorithm or a model-free RL algorithm. Model-free RL algorithms are preferred, for example: a Q-learning algorithm such a DQN, C51, QR-DQN, HER, DDPG, TD3 or SAC algorithm; or a policy optimisation algorithm such as a policy gradient, A2C/A3C, PPO, TRPO, DDPG, TD3 or SAC algorithm. In one example, the ML algorithm comprises and/or is an ensemble method, using more than one algorithm, for example more than one model-free RL algorithm.

Obtaining Training Data

The method comprises obtaining the training data including the respective policies and the corresponding trajectories of the set of spin-stabilized steerable projectiles including the first projectile, wherein each policy relates to steering a projectile of the set thereof towards a target and wherein each corresponding trajectory comprises a series of states in a state space of the projectile.

It should be understood that the steps of obtaining the training data and the training the ML algorithm may be consecutive (i.e. successive or serial, for example, obtaining all the training data followed by training the ML algorithm using the obtained training data) or concurrent (i.e. simultaneous or interleaved, for example, obtaining part of the training data such as a policy and a corresponding trajectory for a particular projectile of the set thereof followed by training the ML algorithm using the obtained part of the training data and repeating).

In one example, obtaining the training data comprises generating at least some, for example all, of the training data, for example by programmatically (i.e. computationally, in silico) simulating the trajectories. That is, the trajectories are virtual trajectories. In this way, the ML algorithm may be trained using hundreds, thousands, tens of thousands or more trajectories of simulated projectiles, thereby accelerating training thereof without, launching physical projectiles. In one example, the method comprises programmatically generating the projectiles. That is, the projectiles are virtual projectiles. In this way, the training is performed in a virtual environment.

In one example, obtaining the training data comprises acquiring at least some, for example all, of the training data, for example by measuring the trajectories using Doppler RADAR (e.g. Weibel 1000e and Infinition BR-1001). In this way, the ML algorithm may be trained using measured trajectories, which may deviate from generated trajectories, for example due to incorrect and/or incomplete simulation. Other methods of measuring trajectories are known. In one example, the method comprises measuring the trajectories. That is, the projectiles are physical projectiles. In this way, the training is performed in a physical environment.

In one example, obtaining the training data comprises generating at least some of the training data and acquiring at least some of the training data, as respectively described previously. For example, the ML algorithm may be initially or pre-trained using the generated training data and the pre-trained ML algorithm trained using the acquired training data. In this way, training of the ML algorithm may be accelerated by pre-training using the generated training data, without launching physical projectiles, and the pre-trained ML algorithm further trained using the acquired training data, thereby.

Policies

Generally, a policy relates to steering a projectile towards a target and is a strategy used by the ML algorithm for steering the projectile towards the target. That is, the policy defines actions to be taken by the ML algorithm to steer the projectile towards the target according to inter alia the current trajectory and state of the projectile.

In one example, a policy It is defined in terms of a Markov Decision Process to which the policy it refers i.e. to steering the projectile towards the target. In one example, the ML algorithm comprises and/or is RL agent and the policy ($\pi(s|a)$) is a decision-making function used by the agent which calculates an action that provides maximum reward, as described below. In one example, the respective policies of the set of spin-stabilized steerable projectiles are provided by a single policy, for example a single policy that is updated during the training, for example during the training of a RL agent, as described below.

Target

It should be understood that the projectile is steered towards the target. In otherwise, the desired goal is to impact the target with the projectile, though the goal may not always be achieved, given an accuracy and/or precision of steering the projectile. In one example, respective targets of the projectiles are the same target. In this way, the ML algorithm is trained, for example optimised, to steer the projectiles towards a particular target. In one example, respective targets of the projectiles are different. In this way, the ML algorithm is trained to steer the projectiles towards different targets. In one example, respective targets of the projectiles are static (i.e. stationary with respect to the environment). In one example, respective targets of the projectiles are moving (i.e. non-stationary with respect to the environment).

Trajectory

It should be understood that a trajectory (also known as flight path) of a projectile is the path of the projectile through the environment. It should be understood that since the projectile is a spin-stabilized steerable projectile, the trajectory is generally parabolic (i.e. a ballistic trajectory) with spin-stabilization and/or steering components of motion combined therewith, as understood by the skilled person. Generally, a trajectory is influenced by air resistance, winds and particularly cross winds, movement of the target, acceleration due to gravity including varying acceleration due to gravity and/or rotation of the Earth, in addition to projectile and launch characteristics, and may be solved and/or simulated numerically at least.

States

Each trajectory comprises the series of states (i.e. successive states) in the state space of the projectile. Generally, environments comprise two types of spaces: state spaces and action spaces. In a fully observable environment, the total state at each time step in the environment may be sensed, for example by a RL agent. In a partially observable environment, a fraction of the environment may be sensed, for example by a RL agent. The total of all the states in an environment is called the episode, which concludes with the last state, the terminal state. It should be understood that the series of states includes at least two different states. It should be understood that the projectile has a single state at any given time (i.e. a current state at a current time) and that the projectile transitions from a current state to a new state, for example directly without a transitionary state or indirectly with a transitionary state.

In one example, steering the projectile of the set thereof towards the target comprises actioning state transitions of the projectile, for example by a controller configured to control the projectile for example provided by the ML algorithm such as an RL agent. By transitioning between the states, for example repeatedly, the projectile is steered (i.e. a net transverse displacement) towards the target.

In one example, each corresponding trajectory comprises a series of portions, for example helical portions, correlating with the series of states. For example, the projectile may be steered by controlling, for example adjusting, a radius of a helical path describing the trajectory, as described below. By way of example, consider a first state associated with a first radius of a helical path and a second state associated with a second radius of the helical path, wherein the first radius and the second radius are different. By transitioning from the first state to the second state and vice versa, the radius of the helical path is changed from the first radius to the second radius and vice versa, resulting in a transverse (i.e. lateral) displacement of the projectile. By transitioning between the states, for example repeatedly, the projectile may be thus steered (i.e. a net transverse displacement) towards the target. For the avoidance of doubt, the projectile does not orientate itself such that its axis is coaxial to the helical path i.e. the nose of the projectile does not follow the direction of the path of the helix, instead, the projectile transitions through a series of states such that its overall path when viewed externally is helical, the axis of the projectile remains substantially coaxial with the generally parabolic trajectory of spin stabilised projectiles.

In one example, the series of states includes finite (i.e. discrete, digital) states of the projectile. In this way, the projectile is steered by transitioning discretely between the finite states, for example directly from a first state to a fourth state, such that the projectile jumps between states. In this way, transitions between relatively different states is accelerated, providing relatively more responsive control. That is, the state space of the projectile includes N of states, wherein N is a natural number greater than or equal to 2, for example 2, 3, 4, 5, 6, 7, 8, 9, 10 or more, and the series of states includes 2 or more of these N states. It should be understood that the N states are different states. In one example, the state space of the projectile includes 2 of states, wherein the first state is a non-actuated state of the projectile and the second state is an actuated state of the projectile, as described below.

In one example, the series of states includes a continuum (i.e. infinite, analogue) states of the projectile. In this way, the projectile is steered by transitioning continuously between the infinite states, for example indirectly from a first state to a fourth state via a second state and a third state, such that the projectile iterates between states. In this way, transitions between relatively different states is graduated, enabling feedback control thereof.

7

Actions

In one example, each state of the series of states in the state space of the projectile is associated with (i.e. due to, caused by) an action in an action space (also known as a control space), for example of a controller configured to control the projectile for example provided by the ML algorithm such as an RL agent. It should be understood that an action causes a state transition of the projectile.

Training

The method comprises training the ML algorithm comprising determining the relationships between the respective policies and the corresponding trajectories of the projectiles of the set thereof based on the respective results of comparing the trajectories and the targets. That is, the ML algorithm is trained using the training data.

It should be understood the relationships relate the respective policies and the corresponding trajectories of the projectiles, for example by associating the respective polices, such as actions of an action space thereof, with the corresponding trajectories of the projectiles, for example the series of states in the respective state spaces of the projectiles. In other words, the ML algorithm is trained by respectively relating the series of states of the trajectories to the policies defining the actions taken by the ML algorithm to steer the projectiles towards the targets. That is, the ML algorithm is trained by relating the effects (i.e. the trajectories) to the causes (i.e. the policies).

In one example, comparing the trajectories and the targets comprises determining (for example, calculating) results, for example transverse (i.e. lateral) deviations of the projectiles at the targets. In one example, comparing the trajectories and the targets comprises determining accuracies and/or precisions (i.e. round-to-round dispersions) of the trajectories with respect to the targets. In one example, comparing the trajectories and the targets comprises classifying the determined accuracies (for example hit or miss) and/or precisions.

In one example, training the ML algorithm comprises training the ML algorithm until a condition is fulfilled, for example a threshold accuracy and/or threshold precision is achieved.

In one example, the method comprises updating the policies, for example a single policy, based on results of comparing the trajectories and the targets Reinforcement Learning In one example:
the ML algorithm comprises and/or is a reinforcement learning, RL, agent; and
training the ML algorithm comprises training the agent, comprising:
(a) actioning, by the agent, a projectile of the set thereof according to a respective policy, wherein the policy is of an action space of the agent, comprising steering the projectile of the set thereof towards a target, thereby defining a corresponding trajectory comprising a series of states in a state space of the projectile and thereby obtaining respective training data;
(b) determining a relationship between the policy and the trajectory based on a result of comparing the trajectory and the target and updating the policy based on the result; and

(c) repeating steps (a) and (b) for the set of projectiles, using the updated policy.
The agent may be as described below.

Controlling Spin-Stabilized Steerable Projectiles Using a Trained ML Algorithm

The second aspect provides a computer-implemented method of controlling a spin-stabilized steerable projectile, the method comprising:
controlling, by a trained machine learning, ML, algorithm, the projectile according to a policy, comprising steering the projectile towards a target.
In this way, the projectile is steered by the trained ML algorithm towards the target, thereby improving an accuracy and/or precision of the projectile.
The spin-stabilized steerable projectile, the controlling, the trained ML algorithm, the policy, the steering and/or the target may be as described with respect to the first aspect.
In one example, the ML algorithm is trained according to the first aspect.

Projectile

In one example, the projectile comprises a front ogive section, an aft section and a command module in communication with the ML algorithm;
wherein the front ogive section is rotatably connected to the aft section by a coupling device and wherein the front ogive section comprises an asymmetric surface; and
wherein angular rotation of the front ogive section is selectively adjustable relative to the aft section by commands from the command module, responsive to the agent, to the coupling device, whereby the asymmetric surface exerts an imbalance upon the projectile to control the trajectory of the projectile.
In one example, the projectile is arrangeable in:
a first arrangement, wherein the coupling device is coupled, whereby the front ogive section spins at the same angular rotation as the aft section and wherein the projectile travels in a first helical trajectory; and
a second arrangement, wherein the coupling device is decoupled, whereby the front ogive section spins at a different angular rotation relative to the aft section and wherein the projectile travels in a second helical trajectory, wherein first helical trajectory comprises a smaller radius than the second helical trajectory;
wherein the first arrangement and the second arrangement are respectively represented by a first state and a second state in the state space of the projectile.

Training a RL Agent to Control Spin-Stabilized Steerable Projectiles

The third aspect provides a computer-implemented method of training a reinforcement learning, RL, agent to control spin-stabilized steerable projectiles, the method comprising steps of:
(a) actioning, by the agent, a spin-stabilized steerable projectile according to a policy of an action space of the agent, comprising steering the projectile towards a target, thereby defining a corresponding trajectory comprising a series of states in a state space of the projectile;
(b) updating the policy based on a result of comparing the trajectory and the target; and
(c) repeating steps (a) and (b), using the updated policy.

The training, the RL agent, the controlling, the spin-stabilized steerable projectiles, the actioning, the policy, the action space, the spin-stabilized steerable projectile, the target, the trajectory, the series of states, the state space, the updating, the result, the comparing and/or the updated policy may be as described with respect to the first aspect and/or the second aspect mutatis mutandis.

In one example, the agent comprises and/or is a Deep Deterministic Policy Gradient, DDPG, agent and/or a Deep Q-Neural Network, DQN, agent.

Controlling Spin-Stabilized Steerable Projectiles Using a Trained RL Agent

The fourth aspect provides a computer-implemented method of controlling a spin-stabilized steerable projectile, the method comprising steps of:

controlling, by a trained reinforcement learning, RL, agent, the projectile according to a policy of an action space of the agent, comprising steering the projectile towards a target.

The spin-stabilized steerable projectile, the controlling, the trained RL agent, the policy, the action space, the steering and/or the target may be as described with respect to the first aspect, the second aspect and/or the third aspect, mutatis mutandis.

Projectile

The fifth aspect provides a projectile comprising a front ogive section, an aft section and a command module communicable with a trained machine learning, ML, algorithm; wherein the front ogive section is rotatably connected to the aft section by a coupling device and wherein the front ogive section comprises an asymmetric surface; wherein angular rotation of the front ogive section is selectively adjustable relative to the aft section by commands from the command module, responsive to the trained ML algorithm, to the coupling device, whereby the asymmetric surface exerts an imbalance upon the projectile to control the trajectory of said projectile.

It should be understood that the front ogive section is defined relative to the direction of travel of the projectile as the leading section of the projectile and the aft section defined as the trailing section relative to the direction of travel. It should be understood that although only two sections are discussed herein, there may be further intermediate sections positioned between said front ogive section and aft sections or in advance of the front ogive section or to the rear of the aft section, for example, a fuze or sensor section in advance of the front ogive section. It should be understood that base bleed, tracer effects or rocket assists may be located rearward of the aft section. Said intermediate sections may rotate relative to the front and/or aft sections or may remain stationary with respect to the front and/or aft sections. The aft section may be the entire section of the projectile that is rearward of the ogive section.

In one example, arrangement of the projectile, for example of and/or in the front ogive section and the aft section, is such that the mass of the aft section is greater than the ogive section.

The front ogive section and aft section may be made of metal, metal alloys, polymers or composites. The front ogive section and aft section may be made of the same or different materials. The front ogive section and aft section may be made from materials chosen according to calibre. Preferably, the front ogive section and aft section are made from metal or metal alloys. The chosen material may fulfil the demands of any engagement scenario or design requirement. For example, being made of more/less dense materials to balance the centre of mass, or being made of hardened materials, for example hardened steels, titanium or carbides, nitrides, to improve terminal performances. As an example, when the calibre is SAA in the range of from 4.6 mm to 12.7 mm the front ogive section and aft section may be made from an inner core of lead or high hardness steel that is enveloped by a copper jacket or copper deposed coating. In a further example, when the projectile is a shell, such as, for example in the range of from 29 mm to 155 mm the front ogive section and aft section are made from steels. The intermediate calibres of 10 to 40 mm, may be made from their typical metal, metal alloys.

The ogive section may be made from a material which has a greater hardness than the aft section. The asymmetric surface is required to control the trajectory, therefore it is desirable that the asymmetric surface is not damaged or deformed during launch. The shape and form of said asymmetric surface will be precision formed, i.e. fine-tuned, so unwanted, or unpredictable, deformation may provide unwanted or unexpected movements of the projectile during activation, and thereby lead to a reduction in predictable control of the trajectory of the projectile.

The front ogive section, aft section and any intermediate sections may be solid to act as a mass damper. Alternatively, the front ogive section, aft section and any intermediate sections may contain recesses and/or voids in order to carry auxiliary equipment, for example, sensors, propellant charges, pyrotechnics and explosives and such like. The front ogive section may also contain grooves or striations to improve aerodynamic efficiency or enhance guidance capabilities.

The front ogive section and the aft section are rotatably connected by a coupling device. The axis of rotation of the coupling device is about the longitudinal axis of the projectile.

The coupling device may be co-axially located within the projectile.

The coupling device function is to selectively couple and decouple the relative rotation between the front ogive section and aft section. In the coupled mode, the front ogive section rotates at the same angular rotation as the aft section. In the uncoupled mode, the front ogive section is allowed to or caused to rotate at a different angular rotation with respect to the aft section. Further the coupling device may provide partial coupling, such that the rate of angular rotation between the front ogive and the aft section may be selectively controlled.

The coupling device may be a passive coupling device to slow rotation of the front ogive section relative to the aft section. The passive coupling device may be mechanical, electromechanical, electromagnetic, or electronic. The passive coupling device may be a brake or a piezoelectric stack. The brake may be a mechanical device, for example a friction brake such as a disc or drum brake. Alternatively, the brake may be a pumping brake. Alternatively, the passive coupling device may comprise a piezoelectric stack which expands to form an interference fit between the front ogive section and aft section in order to slow the relative angular rotation. In a substantially friction free passive coupling device, in the decoupled state, the mass of the aft section is greater than the ogive section, therefore the aft section will have greater momentum than the ogive section, the ogive section will start to rotate at a slower angular momentum. The passive coupling device may be activated to decouple, partially decouple, or even stop the angular rotation of the ogive section relative to the aft section. When the passive coupling device is engaged, or partially engaged to re-couple i.e. couple the ogive section to the aft section, the angular rotation momentum of the aft section will be partially transferred to the ogive and cause them to rotate at the same rate.

The coupling device may comprise an active coupling device such that the angular rotation of the front ogive section can be increased or decreased relative to the angular rotation of the aft section. Such active coupling devices may include a motor assembly.

Where the active coupling device is a motor, for example a servo motor, this allows for active control of the angular rotation of the front ogive section such that it can be progressively slowed and/or increased at differing rates relative to the aft section i.e. a non-linear reduction or increase in angular rotation.

The active coupling device may be an electromagnetic brake assembly, with embedded electromagnets between the front ogive section and aft section, which may be selectively energised in order to increase or decrease the angular rotation of the front ogive section relative to the aft section. This also allows for active control of the angular rotation of the front ogive section such that it can be progressively slowed and/or increased at differing rates relative to the aft section i.e. a non-linear reduction or increase in angular rotation.

Preferably, the coupling device is a passive coupling device. More preferably, the passive coupling device is a brake.

The coupling device may comprise a central shaft linking the front ogive section to the aft section. The aft section and ogive sections, being rotatably mounted thereon. The shaft may be the inner core of a projectile.

The projectile may comprise an electrical connection between the front ogive section and aft section. The electrical connection may be completed between the front ogive section and aft section by way of an electrical slip ring or via the central shaft.

The asymmetric surface of the front ogive section may be any shape such that, in flight, said shape exerts an imbalanced force on the projectile by deflection of the oncoming airflow. For example, the profile of the asymmetric surface may be a chamfer, a fillet, a round, a bulbous profile or conversely, a relief such as a channel or any other suitable profile which enables oncoming air to be deflected to create a net imbalance on the projectile.

The asymmetric surface of the front ogive section may comprise an aerodynamic lifting surface. The aerodynamic lifting surface may be any shape where, in flight, said shape exerts a lifting force on the projectile by deflection of the on-coming airflow. For example, the profile of the aerody-namic lifting surface may be a chamfer, a blunted ogive, a truncated ogive, a fillet, a round, a relief, a NACA profile or a bulbous profile or any other suitable profile which enables oncoming air to be deflected to create a lifting force on the projectile. It will be appreciated however that simpler designs such as a truncated ogive where there is provided a flattened face on the ogive lend themselves to mass production techniques.

In a preferable arrangement, the asymmetric surface of the front ogive section is an aerodynamic lifting surface. More preferably, the aerodynamic lifting surface is a truncated ogive.

In a preferable arrangement, the profile of the asymmetric surface is within the diameter of the projectile, i.e. it does not extend out-with the bounds of the plan view of the projectile. Such arrangement avoids the need for deployment mecha-nisms, which use valuable internal space within the projec-tile, to deploy the asymmetric surface out-with the original diameter of the projectile after firing.

The projectile may be capable of deforming to create the asymmetric surface after firing. Such asymmetric surface may be created by a piezoelectric effect, mechanical defor-mation, chemical decomposition or any other suitable means whereby the projectile may deform into an asymmetric surface after firing, for example, a secondary charge which explodes to deform the front ogive section into an asym-metric surface. Such arrangement allows for lower drag coefficients on the projectile for a period of time whilst in the symmetric configuration, for example, during a long transit time. When guidance is required near a target area, the projectile may be actively and controllably deformed to create the asymmetric surface thereby enabling guidance and control.

The deformation of the projectile to create the asymmetric surface may be reversible such that in different phases of flight, the projectile can be selectively deformed and restored to selectively enable guidance and control.

The projectile may comprise a retractable element to selectively create the asymmetric surface. Such retractable element may be selectively engaged and disengaged in order to create the asymmetric surface. Said retractable element may be housed within the front ogive section or both the front ogive section and aft section.

The retractable element may be arranged in combination with, or separate to, the deformable asymmetric surface as herein described.

The asymmetric surface may extend in the range of from 1 to 359 degrees around the plan face of the projectile. Preferably, the asymmetric surface extends in the range of from 40 to 180 degrees around the plan face of the projectile.

The projectile may comprise a continuous surface, for example the outer profile of the projectile may be a smooth blended surface absent from protruding fins or control surfaces i.e. the projectile has a uniform ogive "bullet" shape.

It will be appreciated that absence of fins or movable control surfaces, reduces the requirement for maintenance and inspection of said fins and control surfaces, this may lead to increased reliability of the projectile. Further, the absence of protruding fins and control surfaces has been found to substantially reduce the required internal space within the projectile for associated control modules, motors, actuators etc. which allows for an increase in charge, pro-pellant, explosive material, and sensors to be carried or alternatively can be used to minimise mass on a projectile. Further, external fins or control surfaces are susceptible to damage during launch, such as, for example from vibrations and/or collisions with the barrel) if they are a comparable size to the calibre of the projectile. In addition, the deploy-ment or actuation mechanisms used to deploy the external control surfaces are susceptible to failure during extreme launch environments.

The projectile may be suitable to be fired from a smooth bore barrel, such that no spin is imparted upon the projectile at launch, in such an arrangement an active coupling device may be required to cause a differential angular rotation between the aft and ogive section.

In use, a smooth bore projectile will travel in a substan-tially straight line trajectory neglecting gravity. The asymmetric surface may exert an imbalance upon the projectile creating a net force acting on the projectile thereby altering the course of the projectile. It will be appreciated that in a smooth bore, unspun projectile, the coupling device must be an active coupling device in order to change the relative angular rotation of the ogive compared to the aft section, to allow the resultant vector of the force imbalance caused by the asymmetric surface. In an unspun projectile, there is no energy which can be harvested from the aft section spin in order to change the angular direction of the asymmetric surface of the front ogive section. Therefore, utilising an active coupling device, for example, a servo motor, the front ogive section comprising the asymmetric surface is selectively rotated clockwise or anticlockwise relative to the aft section in order to direct the imbalanced force in the correct direction and thereby control the trajectory of the projectile.

In a highly preferred arrangement the projectile may be a spun projectile which is fired from a rifled barrel, such that the rifling in the barrel imparts a spin on the projectile during launch and flight. Such spin is often used by projectiles to provide ballistic stability during flight, the projectile may have inherent instability due to weight distribution along the length of the projectile being commonly biased to the aft end. In a rifled projectile, the projectile will travel in a substantially helical path towards a target.

In the spun projectile arrangement comprising the coupling device, the front ogive section comprising the asymmetric surface is selectively coupled and decoupled with the aft section. In the decoupled mode, the front ogive section will begin to slow the rate of spin with respect to the aft section due to an aerodynamic roll damping moment.

After a period of time the system will reach a new steady-state, where spin rate of the front ogive section is slower than the aft section. The control force from the aerodynamic surfaces on the ogive act in a tangential direction for longer, resulting in a larger radial acceleration. The projectile thus travels further radially before the control force rotates to oppose the motion. The result is that in the decoupled state, the trajectory forms a larger helix diameter than in the coupled mode. The coupling device may then be disengaged, to allow the front ogive section to be progressively re-coupled with the aft section, the front ogive section may then be accelerated by the aft section, which still has the relatively higher spin rate, back to the initial state the system was in before the brake was first decoupled returning to the substantially original, smaller helix diameter.

In comparison to the use of external protruding fins and thrust vectoring to exert a control force on a projectile as is known in the art. The coupling and decoupling of the front ogive section with respect to the aft section using the coupling device results in the ability to selectively increase and decrease the helix diameter of the projectile thereby enabling effective steering of the projectile towards a target.

In a spun projectile the arrangement may comprise an active coupling device, for example a servo motor, the front ogive section may be selectively rotated clockwise or anticlockwise relative to the aft section. Such arrangement works in a similar fashion to that of the passive coupling device, ie the braking device, however an active coupling device may result in faster settling times of the system to a steady state which enables the projectile to action more commands within a given timeframe thereby enabling greater precision in guiding the projectile towards a target.

Preferably, the projectile is a spun projectile comprising a passive coupling device.

The control module is operably linked to issue guidance commands to the coupling device to steer the projectile to a target. The control module causes the coupling device to selectively couple and decouple the ogive and aft section based on the issued guidance commands.

The control module may comprise internal guidance instrumentation such as for example, gyroscopes, accelerometers or other inertial sensors such that the projectile can inherently calculate its position relative to a pre-loaded target without reference to an external targeting and/or location system.

The control module may further comprise sensors such as for example, optical sensors, RF sensors and such like in order to determine the location of a target in flight and calculate and issue guidance commands to steer the projectile to said target.

The control module may be located in the front ogive section or the aft section or any intermediate section. Preferably, the control module is located in the aft section.

The projectile may comprise a receiver for receiving guidance instructions from an external targeting and/or location system. Said receiver may include for example, an RF receiver or an optical receiver.

The projectile may be linked by a wire to a launch point wherein signals can be received via the wire. The launch point may be in communication with the control module. In a preferable arrangement, the projectile may comprise an optical receiver.

The guidance instructions may originate from an external targeting and/or location system, for example, a laser designator, GPS transmitter, RF transmitter or electrical signals via wire or optical guided projectile arrangement.

In a further preferable arrangement, the projectile may be a beam rider projectile such that the projectile comprises an optical receiver wherein the projectile attempts to stay on the path of a laser beam based on the strength of laser signal on the optical receiver.

The projectile may comprise a transmitter for transmitting the projectile's position. Said transmitter may include for example, an RF transmitter or an optical transmitter. The projectile may be mounted with an array of sensors to relay position and orientations to the control system. The projectile may also be fitted with some passive or active identifier, such as a reflective surface or RF beacon, which an external observer can use to identify the location of the projectile using imaging equipment and sensors. In a preferred arrangement, the projectile may comprise a passive surface to reflect light back to an observer, so as to minimise power consumption. The transmitter may be in communication with the control module.

The transmitter for transmitting the projectile position may aide in the location and acquiring of guidance instructions from an external transmitter.

The projectile may need to both transmit and receive, any may comprise a transceiver module, to allow two-way communication.

The projectile calibre may vary in the range of from small calibre direct fire projectiles, bullets, for example 0.22LR to indirect fire projectiles, artillery shells, such as, for example up to 155 mm shells, or larger.

It will be appreciated by the skilled person that the teachings contained herein may be applied to any calibre projectile providing a coupling device is embedded within the projectile to allow the rate of angular rotation of the front ogive and aft section to be selectively controlled, and wherein the front ogive section comprises an asymmetric surface such that an asymmetric force can be exerted upon the projectile thereby enabling guidance and control.

System

The sixth aspect provides a system comprising a projectile according to the fifth aspect and a computer, comprising a processor and a memory, comprising a trained machine learning, ML, algorithm communicable therewith.

In one example, the system comprises a targeting system, for example an external targeting system, and/or a location system.

Computer, Computer Program, Non-Transient Computer-Readable Storage Medium, Trained ML Algorithm, Trained RL Agent The seventh aspect provides a computer comprising a processor and a memory configured to implement a method according to the first aspect, the second aspect, the third aspect or the fourth aspect.

The eighth aspect provides a computer program comprising instructions which, when executed by a computer comprising a processor and a memory, cause the computer to perform a method according to the first aspect, the second aspect, the third aspect or the fourth aspect.

The ninth aspect provides a non-transient computer-readable storage medium comprising instructions which, when executed by a computer comprising a processor and a memory, cause the computer to perform a method according to the first aspect, the second aspect, the third aspect or the fourth aspect.

The tenth aspect provides a machine learning, ML, algorithm trained according to the method according to the first aspect or a reinforcement learning, RL, agent trained according to the method according to the third aspect.

Definitions

Throughout this specification, the term "comprising" or "comprises" means including the component(s) specified but not to the exclusion of the presence of other components. The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Generally, machine learning (ML) is concerned with the development of algorithms which a computer can use to complete a task optimally, without being given explicit instructions on how to complete said task. Reinforcement learning (RL) is a specific type of ML, where an agent derives an optimal policy to maximise the future cumulative reward of every possible action.

Figures 1, 2:
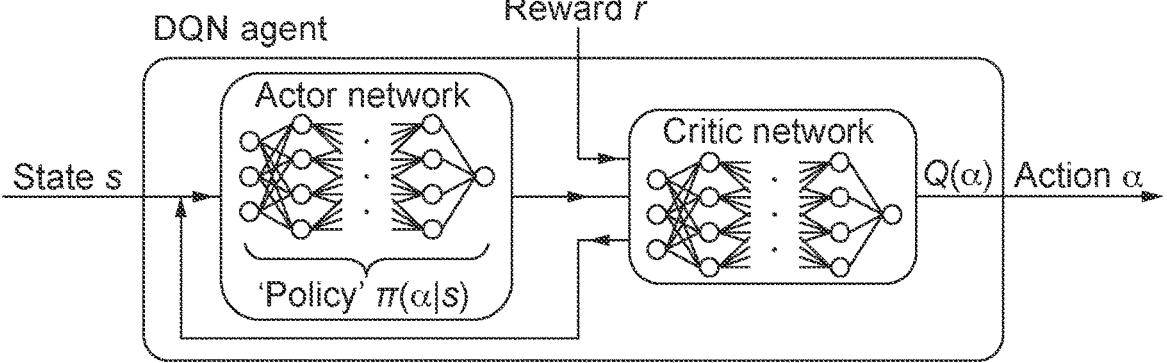
FIG. 1 schematically depicts a reinforcement learning (RL) agent.
FIG. 2 schematically depicts a RL agent using an actor/critic RL algorithm.

FIG. 1 shows a diagram for operation of a typical RL agent. The agent uses a certain policy $\pi(s, a)$, to evaluate which action a it should take given the current state s of the system, in order to maximise its expected reward r. To determine what the optimum policy should be, it uses a reinforcement learning algorithm, to change the policy by comparing the actual to expected reward. RL algorithms include model-based RL and model-free RL.

In model-based RL, the agent learns or is provided with a function which maps state transitions. In the majority of cases, a 'ground truth' model will not be available to the agent; i.e. the model used to represent the system may not perfectly represent the real-world environment. Where the model is not a perfect representation of ground-truth, there are usually biases in the model, which the agent may exploit to maximise rewards, but which may not translate to real-world performance.

Q-learning and policy optimisation are both types of model-free reinforcement learning algorithms. Policy optimisation methods represent the policy in terms of neural network parameters $\theta$, i.e. policy $\pi_\theta(a|s)$. The policy $\pi_\theta$ is then maximised against the neural network parameters $\theta$ using either gradients ascent or local maximization, for example. This allows optimisation for any chosen set of $\theta$, but may be hindered if the end performance of the model cannot be quantified in terms of the chosen neural network parameters $\theta$. In Q-learning, the agent uses a Q-value Q(s, a) in addition to the policy. The Q-value of a given action represents the expected reward from all successive actions in the current state. The action with the highest Q-value Q (s, a) indicates it leads to the highest cumulative reward. We define the Optimal Action-value function Q*(s, a), as a function that returns the highest average Q-value Q(s, a) of every action given the current state. Q-learning methods learn an approximator function Qe(s, a) which is updated during training so the Q-value Q(s, a) more accurately represent the reward and approach the optimal action function. This update process may use the Bellman equation:

$$Q(s, a)_{new} = Q(s, a) + \alpha\left[r(s, a) + \gamma\max_{a'}[Q^*(s', a')] - Q(s, a)\right] \quad (1)$$

with learning rate $\alpha$, reward r(s, a), discount factor $\gamma$ and updated Q-value Q(s, a)$_{new}$.

TABLE 1

| Terminology for Q-Learning environment | |
| --- | --- |
| Term | Definition |
| Action (a ∈ A) | A parameter of the environment the agent can change in order to cause a desirable change. In Deep Q-learning the agent can be comprised of an actor and critic network. |
| Actor | A neural network responsible in place of the operational policy |
| Agent | The operator which takes an action to change the state of the environment |
| Critic | A neural network which evaluates the performance of the actor based on the new reward and is capable of adjusting the actor to optimise the new reward |
| Discount factor (γ) | A scalar factor between 0 and 1 sets the importance of immediate (γ → 0) or long term reward (γ → 1). |
| Environment | The external place where the system evolves |
| Learning Rate (α) | A parameter which determines the step size of each iteration when minimising a loss function |
| Loss function | A function which maps an event to a real number characterising the cost associated with that particular event |
| Observation | Parameters or measurements of the system which are taken from the environment and passed to the agent |
| Policy (π(s|a)) | The decision-making function used by the agent which calculates the action that provides the maximum reward |
| Reward | A scalar value representing the desirability of a state |
| RL Algorithm | The method used by the agent to optimise the policy according to the received reward |
| Q-value (Q(s, a)) | The cumulative reward which would be expected if an agent in a state s, performed an action a and continued to operate under the current policy π |
| Reward Function | An equation which calculates the reward for a given statelaction combination. |
| State (s ∈ S) | A particular combination of a given Observation and actions |

In relatively simple systems, there may be a computationally manageable amount of states and actions within the environment. A common approach for the Q-function is to use a lookup table, which maps every state-action pair to a Q-value, which is then updated with every iteration of the loop. If the system is significantly complicated, or the states are continuous then a lookup table is no longer practical and a new function must be used. Deep Q-Neural Network learning (DQN) is a variant of Q-learning which uses a neural network to approximate the Q-function for a given state-action pair. There are also many other variants of Q-learning, such as Fuzzy Q-learning.

Another common structure in RL algorithms is the 'actor-critic' method. Here, the actor can be thought of as the traditional policy $\pi(s, a)$, which determines the optimal action to maximise the expected reward given the current state. In general, the critic will in some way evaluate how well the actor is performing and will provide the actor with feedback to adjust its performance based on this; i.e. the critic will compute a value function, which assists the actor in learning the optimal policy. Q-learning is an example of this, where the Q-value is what encapsulates the actor performance information. The critic takes the current state and the action from the actor and use these to compute and expected reward. Then it compares the expected value to the actual reward once the action outputted from the actor has been fed to the environment. Common algorithms including actor-critic methods are A2C and the A3C used by Deepmind. FIG. 2 shows a DQN agent using an algorithm where neural networks are used for both the actor and critic. Using neural networks instead of traditional functions allows the agent to handle a very large domain.

A general problem with reinforcement learning is that an agent which is perfectly trained in the virtual environment will completely fail to perform when it is implemented into a real world system. This is because even the most accurate model is still not accurate enough to portray the stochastic nature of the real world. To combat this, a methodology is being used where the observations are intentionally perturbed during the training process to emulate real world noise. This done by means of an 'adversary', which introduces perturbations according to its own policy. It has been shown that under such circumstances, algorithms can be written which are able to successfully mitigate the impact perturbations have on the training procedure successfully.

When machine learning is being used for control, it is advantageous to make the system it must control as simple as possible. A complex system requires a large neural network to be able to process the different system states and interpret the correlation between desirable actions and the specific parameter set which caused them. Also, the environment the agent is trained in should be as similar as possible to the environment it will operate in.

This problem is perfectly suited for the application of an AI controller. Deep Q-learning agents have been demonstrated to perform at least as well, if not considerably better than humans in a variety of arcade style games. Deep Deterministic Policy Gradient (DDPG) methods allow continuous control of multiple actions which can be used here for a GL implementation.

The concept of reinforcement learning is that the agent will, for a given system state, use a policy to determine which action it should take to maximise a 'reward'. This reward is calculated from the reward function R. The reward function does not have to contain any of the observations the agent makes of the environment or be any states of the system. Since the reward is computed externally, the reward may be completely arbitrary since the purpose of the reward function is to characterise the required behaviour of the agent. It can use a reward to reinforce good behaviour or a penalty to penalise undesirable behaviour. In general, rewards incentivise the agent to keep doing what it is doing to accumulate reward, while penalties cause the agent to attempt to reach a terminal state as quickly as possible to minimise loss.

By design, the policy used by the agent should maximise the expected reward by any means necessary. Quite characteristic of machine learning is the concept of a local minima, where the agent has learnt to exploit a particular aspect of the environment to increase its short term reward. It is possible for the agent to continue exploration and navigate out of this local minima, but the agent may continue the exploitation if the training does not contain sufficient episodes. Alternatively, the gradient between the local minima and the global maxima may be so great that the chances of the agent exploring through it is very low, even with sufficient episodes. As such, the reward function should be chosen very carefully and may even require different iterations after observing the results of agent training.

If rewards are only given for achieving a goal, the agent may never fully explore the environment to attain the reward and even if it does, it may happen very slowly. To rectify this, additional reward can be given for behaviour which tends towards the final goal but even this must be carefully chosen. If the reward is given in finite chunks then the same problem will arise as with only rewarding success, the agent will learn much slower. As such, the given reward for good behaviour should be continuous where possible, with a bonus given for success. This is the same for penalties, where bad behaviour should be penalised continuously with a substantial negative reward accompanying a failure. A 'penalty' henceforth refers to a reward penalty, i.e. a penalty of −5 does not equate to a reward of +5, rather a 'penalty' of −5 is the same as a reward of −5 but with the associated negative connotations. A common idea is to reduce the scope of the search by prematurely terminating an episode if the parameters stray outside a certain range, where a large penalty will accompany the termination. This should be tested during implementation, as a successfully trained agent should still achieve its goal when operating outside of the given range.

Take for example a simplified robot golf, where an agent must move a ball around a field with the aim of dropping it into a target hole. Initially, a reward will be given for achieving the goal of getting the ball in the hole, which is a success. Equally there is no point exploring millions of miles away from the hole. If for example, the ball strays further than 10 m away then the episode can then be terminated along with a substantial penalty.

Figure 3A:
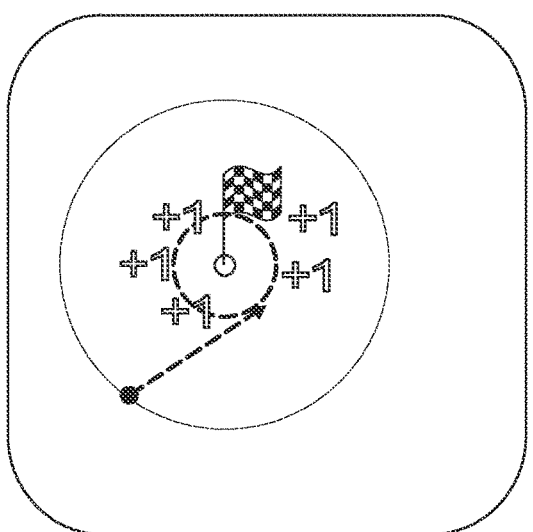
FIGS. 3A and 3B schematically depict effects of adding a reward proportional to distance.
Figure 3B:
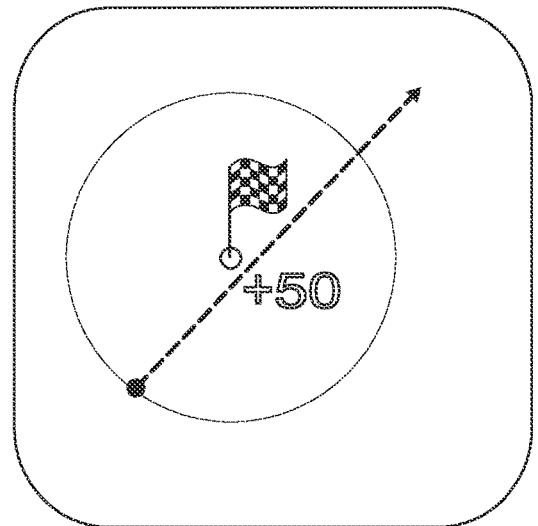

One could provide a reward directly proportional to the distance from the hole in addition to a lump sum reward for achieving the goal. This incentivises the ball to move closer toward the hole. Unfortunately, the agent is able to exploit this system in two ways. Firstly, the agent could control the ball to orbit the hole, to indefinitely accumulate a mediocre reward (FIG. 3A). Alternatively, the agent could control to move the ball straight past the hole, to maximise the reward in one quick burst but never actually achieve success (FIG. 3B).

Figure 4A:
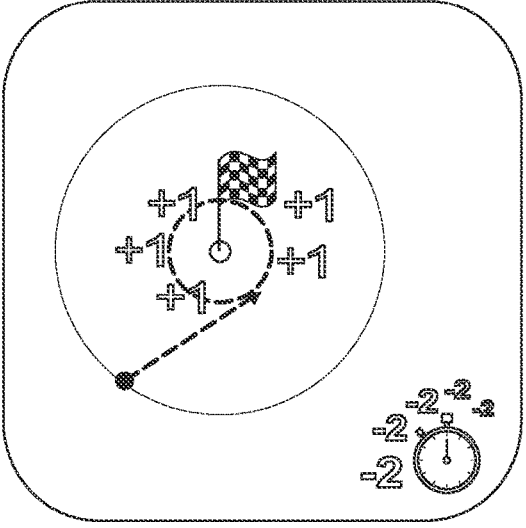
FIGS. 4A and 4B schematically depict effects of adding a time penalty.

Hence, a temporal aspect may be added to the reward by penalising the agent for the time it takes to complete the episode. If the ball continues to orbit the hole, the agent will be penalized (FIG. 4A). There is a larger probability the agent will explore alternative options and find a more ideal path toward the hole. If the goal of an agent is to avoid failure as opposed to achieving a goal, as in the inverted pendulum system, then a reward might be given for each consecutive time-step the system does not fail.

Figure 4B:
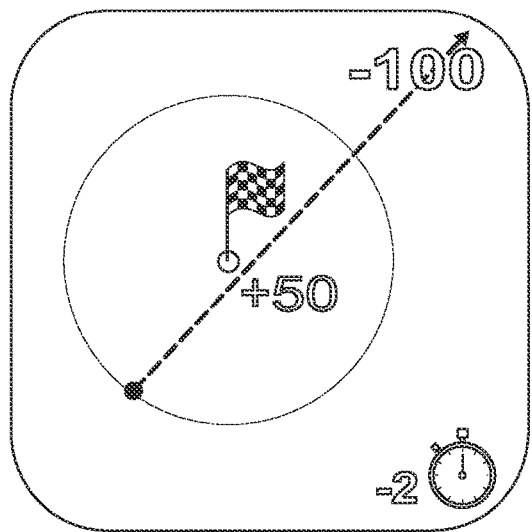

A notable case of exploitation is where the penalty for terminating an episode early is small compared to the reward for moving straight past hole. This, combined with a penalty for taking a long time to achieve the objective causes the agent to move the ball past the hole and fly outside the search range as fast as possible. This is referred to as a 'dive-bomb' (FIG. 4B). This maximises the reward, terminates the episode early to stop the agent being penalised. From this, it can be deduced that the reward magnitude for moving towards success should be significantly smaller that the magnitude of the penalty for premature termination, which should in turn be significantly smaller than the reward for achieving the goal.

Figure 5:
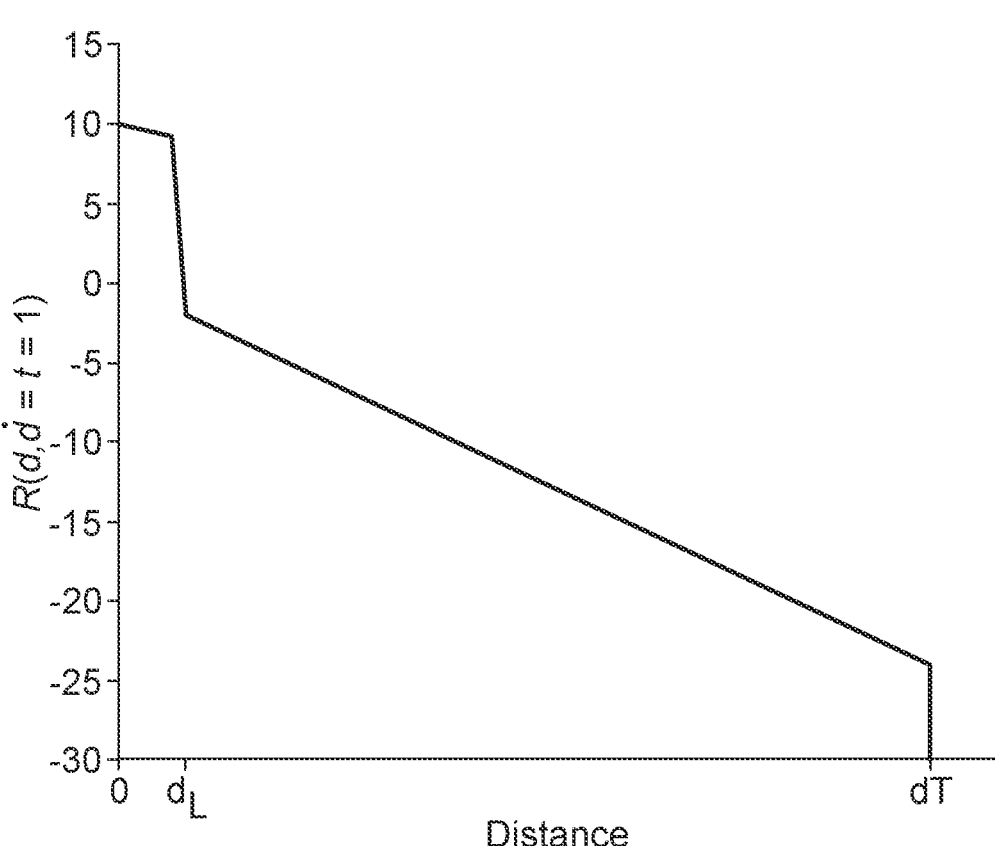
FIG. 5 schematically depicts a reward function.
Figure 6A:
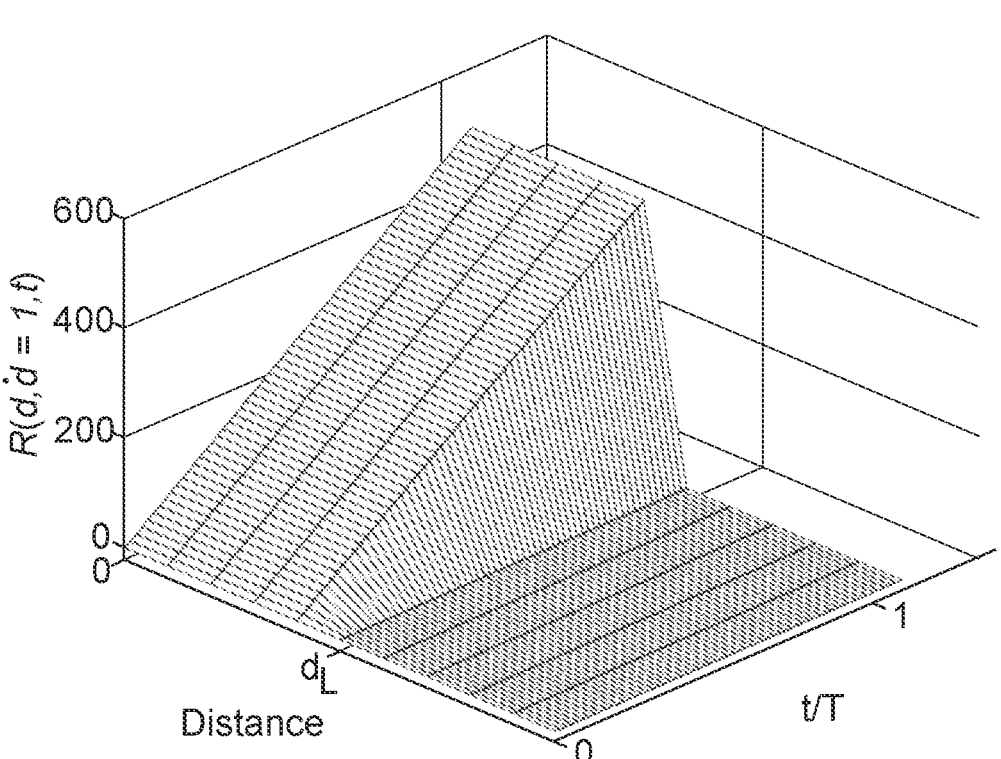
FIGS. 6A and 6B schematically depict reward function dependency on time t and error rate $\dot{d}$.

Following the justification described above, the reward function may be chosen to be:

$$R(d, \dot{d}, t) = \begin{cases} k_t t & \text{for } d < d_L \\ -d & \text{for } d_1 \leq d < d_T \\ k_T & \text{for } d_T \leq d \end{cases} + -\dot{d}d \qquad (2)$$

where $k_t = 10$ is the time dependent reward coefficient, $k_T = -1000$ is the early termination penalty, $d_T = 12$ is the early termination distance and $d_L$ is the lower accuracy threshold. This reward function is shown graphically in FIG. 5. The first term of Equation (2) provides the associated reward for the distance around the target. If the projectile is more than $d_T$ away from the target at any point in time, the episode is immediately terminated and a 1000 point penalty is incurred. For $d_L < d < d_T$ the penalty is directly proportional to distance. Lastly, a reward of $k_t$ is given for a any value of $d < d_L$. Note that d cannot be negative, since it is a radial distance. This reward is then scaled by the time duration of the episode; if $d < d_L$ at the end of the episode it will receive a much higher reward than travelling through the target initially. While this may cause the agent to attempt to arrive at the target right at the end of the episode, it will achieve substantially more reward by hovering over the target throughout the episode (FIG. 6A).

Figure 6B:
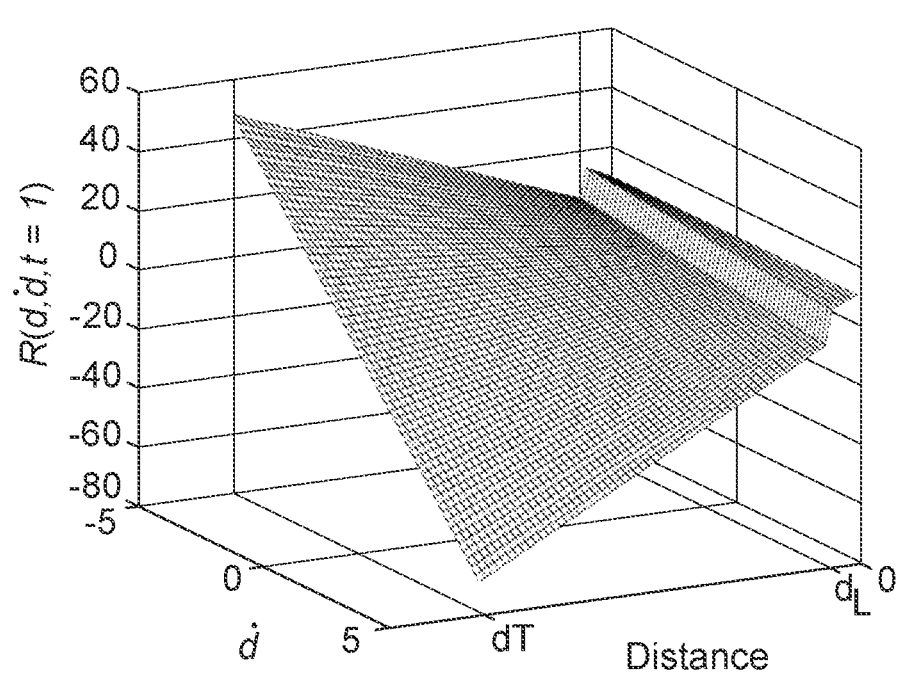

The second term includes the error rate, $\dot{d}$. This dynamic system has a constant force vector. It is not unreasonable that to guide the projectile to the target, that the agent will keep the force vector pointed in direction of the target for as long as possible to achieve the goal. However, since the episode doesn't terminate when the target is reached the projectile will likely fly straight past the target in a scenario similar to the 'sling-shot' shown in FIG. 3B. By observing $\dot{d}$, the agent will be able to deduce when both $\dot{d}$ and d are small, the reward is maximised. i.e. if the projectile moves slower when in close proximity to the target it will maximise the reward over time. Note that a negative $\dot{d}$ indicates the projectile is moving towards the target. The $-\dot{d}d$ term in Equation (2) punishes the agent for moving away from the target and is scaled proportional to d. This is still consistent with the goal of being less than d away; a perfectly circular orbit with a radius of less than $d_L$ will have $\dot{d}=0$, which does not punish the system while still rewarding it for the close proximity (FIG. 6B).

The boundary of $d_L$ used during training is arbitrary, but the reasoning is justified. For the creation of a direct-fire guided-projectile to be worthwhile it must deliver dispersion characteristics that are at least the same or better than the equivalent unguided projectile. As such, this $d_L$ boundary, in a more complete training environment, will represent the accuracy level required by the round at that range. This also leads onto the justification for not terminating the episode when the projectile arrives at the target. The purpose of the guided weapon is to account to for variation in target location caused by factors only introduced during the projectile's flight. This includes range, which would affect the time of impact, even if that is accounted for at launch. Since the prototype is designed to be a beam rider, this logic for the agent is used to keep the projectile on the beam.

Lateral Acceleration

Without being bound by theory, one example of guidance is to determine the projectile lateral acceleration (latax) as a function of the size of the angle through which the front ogive section is slowed ($2\phi_a$) and the direction about which the bias manoeuvre is centred ($\phi_B$). Starting from the fundamental laws of motion, it can be shown that the latex of the projectile a can be written as:

$$\vec{a} = \begin{bmatrix} a_x \\ a_y \end{bmatrix} = \frac{\int_0^\tau F(\phi, \phi_a) \cdot dt}{m \int_0^\tau \omega^{-1}(\phi, \phi_a) \cdot d\phi} \begin{bmatrix} \cos(\phi_B) \\ \sin(\phi_B) \end{bmatrix}$$

Where $a_x$ and $a_y$ are the horizontal and vertical projectile latex respectively, F is the control force acting on the projectile, m is the projectile mass, and $\omega$ is the rotational speed of the front ogive section (and thus the control force). These terms can either be solved analytically or numerically, under different assumptions. In either case, this latex equation can then be used in conjunction with any existing or novel guidance law (such as proportional navigation) to control the projectile.

One simple assumption that may be made is to model the asymmetric surface as exerting a constant force $F_c$ through a roll angle $\phi$ with rate $\omega_0$ or $\omega_1$ where $\omega_0 < \omega_1$. The term $\psi \in [0, 2\pi]$ describes the roll orientation of $F_c$ with respect to the normal axis of the projectile. The model uses fixed magnitude $F_c$ rolling at speed $\omega_1$. The roll rate is slowed to $\omega_0$ through favourable roll angles when $F_c$ is aligned with the desired correction axis, then accelerated back to $\omega_1$ through the remaining unfavourable roll angles. The act of slowing $F_c$ when sweeping through favourable roll angles is henceforth referred to as 'bias'. The switching between spin speeds is instantaneous.

The integral of Newton's second law relates to the impulse of an object, J, to its change in velocity $\Delta v$:

$$J \mid \Delta t = m \Delta v \mid \Delta t$$

wherein the mass m is assumed to be constant since there are no on-board resources being consumed.

A generalised decomposition of $F_c$ onto any orthonormal axis i, j, in the plan view plane of projectile, herein denoted as YZ has the corresponding forces $F_i$, $F_j$. Let the desired decomposition axis i be an angle axis $\phi_B$ from the normal axis $\hat{z}$ (where $\phi=0$). Let $\phi_i$ be a particular angle between $F_c$ and the arbitrary decomposition axis i. Let $\phi_a$ be the angle through which $F_c$ sweeps at a given rate w such that the sweep begins at the angle ($\phi_B - \phi_a$) and ends at $\phi_B$.

23

The range of angles during which $F_c$ is slowed is defined as the bias angle. Let the mid-point of the bias angle coincide with decomposition axis i, such that the symmetrical angle on either side of the midpoint is $\phi_a$. The bias angle thus starts at $(\phi_B-\phi_a)$ and ends at $(\phi_B+\phi_a)$ with a midpoint of $\phi_B$. $F_c$ will continue to rotate through the rest of the angle $\phi$ eventually sweeping another angular range $(\phi_B+\pi)\pm\phi_a$ (wrapped so $\phi\in[0,2\pi]$). During this time the resulting change in velocity is directed along the negative $i^{th}$ axis.

$\Delta V$ is defined as the total change in velocity of one whole roll rotation in sweeping through equal but opposing angles of size $2\phi_a$, at different rates $\omega_0$ and $\omega_1$. Assuming $F_c$, m and $\omega$ are constant, it can be shown from that;

$$\Delta V = \frac{2F_c}{m}\sin(\phi_a)\left(\frac{\omega_0 - \omega_1}{\omega_0\,\omega_1}\right)$$

The maximum bias angle is half of a roll rotation, $\phi_{a,max}=\pi/2$. The maximum $\Delta V$ per rotation is thus given by:

$$\Delta V_{max} = \Delta V\mid\phi_a = \pi/2$$

which is evaluated for a given system.

One example of a novel guidance law is the following Quasi-dynamic Guidance Law (QDGL). The QDGL calculates a desired change in speed when $\phi=0$, then calculate the bias angles from the above equation. The projectile will then continue to roll, whereby the asymmetric surface will slow the roll if the current roll angle lies within the bias range previously calculated.

In practice, the desired speed change and resulting bias angles are calculated when o lies in a small range, $\phi\in[0, 0.001]$, to account for the control module inaccuracy. While this calculation could be conducted and updated continuously, the relative speeds would have to transformed to the $\phi=0$ reference frame which adds another layer of computational complexity. In addition, this finite computation of speeds at the beginning of each rotation accommodates the bandwidth of hardware with respect to the roll rate of the projectile.

The current relative velocity of projectile to target is the difference between the projectile and target velocity, $$V_R = \begin{bmatrix} u_R \\ v_R \end{bmatrix} = \begin{bmatrix} u - u_T \\ v - v_T \end{bmatrix}$$

To achieve a circular trajectory in the resting state, the horizontal velocity at the beginning of the bias calculation must assume the control force has already rotated through one quarter rotation. Taking this into consideration, we define $V_{DR0}$ as the $\Delta V$ correction necessary to bring the projectile to a stable circular orbit relative to the target, including the current relative velocity;

$$V_{DR0} = \begin{bmatrix} u_R +\Delta V\mid\phi = \pi/4. \\ v_R \end{bmatrix}$$

This only allows the control module to bring the projectile to relative rest, the desired closing speed $V_{PT}(d)$ describes the chosen approach speed as a function of d. The total demanded velocity change from the velocity control module $V_{Dem}$ is then a linear combination of the necessary relative speed correction to bring the system to an orbit, $V_{DR0}$, and the closing velocity $V_{PT}(d)$ dictated by the QDGL:

$$V_{Dem} = V_{DR0} + V_{PT}(d)$$

$V_{PT}d$ must only demand speeds which can be delivered by the asymmetric surface, given that $\Delta V$ can never exceed $\Delta V_{max}$. Let the function $V_{lim}(d)$ be the maximum relative speed the projectile can have at a distance d≥0, such that it is still able to decelerate in time to be at relative rest when d=0. This function can be calculated by starting with a stationary projectile and applying consecutive $\Delta V_{max}$ biases, since the process is reversible.

An effective acceleration value, $a_{eff}$, is measured from simulations for consecutive $\Delta V_{max}$ biases. Using this, it can be shown that;

$$V_{lim}(d) = (2a_{eff}, d)^{\frac{1}{2}}$$

Since the function $V_{PT}(d)$ is calculated when $\phi=0$ at a particular distance $d_1$, the desired $\Delta V$ will not be achieved until after the bias manoeuvre has been executed, one full rotation later. Hence, the process is discontinuous. By this point the projectile will have moved to some new distance $d_2$, under its residual velocity. This delay causes the system to exceed $V_{lim}(d)$, resulting in an overshoot. To account for the delay, the demanded speed is modified by a factor $\xi$ which ensures the relative speed never exceeds $V_{lim}(d)$. The delay does not directly scale with distance but rather with $V_{PT}(d)$ as it is the result of dynamic system evolution. Hence the closing speed function is written as;

$$V_{PT}(d) = V_{lim}(d) - \xi,$$
$$\xi\in\mathbb{R} \geq 0$$

where $\xi$ is a constant to be optimised.

In one example, the radial velocity of the projectile to the target may be governed by the QDGL equation:

$$V_{PT}(d) = \begin{bmatrix} V_{lim}(d) - \xi \\ V_k \\ 0 \end{bmatrix}\forall\, d \in \begin{cases} d_1 \leq d \\ d_2 \leq d < d_1 \\ 0 \leq d < d_2 \end{cases}$$

wherein;
$V_{PT}(d)$—the lateral speed at which the projectile closes the target (to make the miss distance, i.e. the distance between the target and where the projectile impacts, equal to 0.
$V_{lim}(d)$—the maximum lateral speed correction the projectile is capable of making at full, saturated actuator effort.
$\xi$—delay modification factor
$V_k$—chosen constant speed to enable quicker dynamic response.
d—lateral distance to target (miss distance).
$d_1$—desired distance to switch from $V_{lim}(d)-\xi$ to $V_k$, to minimise actuator effort and conserve resources.

d$_2$—the desired level of accuracy of the projectile e.g. the acceptable miss distance is within 2m of target, this is satisfactory and no further corrections are necessary.

The above equation determines what the lateral speed of the projectile should be, depending on what the lateral distance (d) is. If there is a large discrepancy between the target and the estimated trajectory i.e. the projectile is on course to miss the target by a significant distance, the control module will correct it's trajectory as quick as is possible without overshoot ($V_{PT}(d)=V_{lim}(d)-\xi$), if the distance is small, the control module will calculate guidance such that the radial velocity of the projectile is low and be ready for a change to conserve resources ($V_{PT}(d)=V_K$). Finally, if the projectile is on course to hit the target or is within an acceptable miss distance, the control module will not make any further commands thus the projectile will stay on course ($V_{PT}(d)=0$).

Implementing RL Agents into Simulink Dynamic Model

Figure 7:
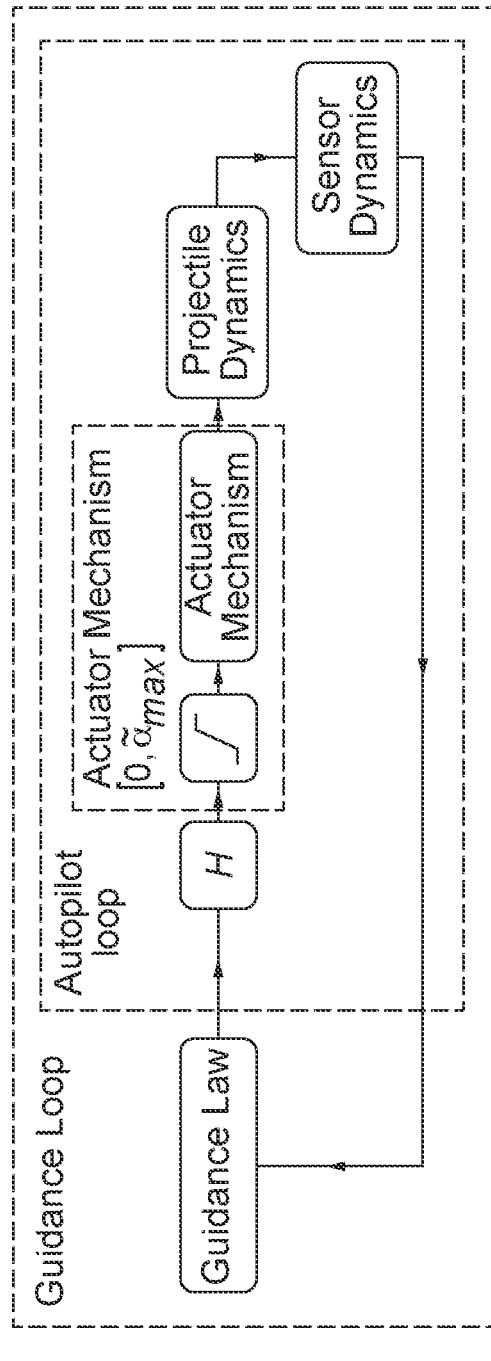
FIG. 7 schematically depicts a Simulink block diagram for velocity based actuation mechanism and Guidance Laws.

MATLAB has a Reinforcement Learning toolbox which can be used to create a variety of RL agents, as well as a Deep Learning Toolbox which can be used for the implementation of neural networks. The Simulink model for the AI controller is shown in FIG. 7. Where applicable, the AI agent will either replace the actuator autopilot or the Guidance Law (GL) block. Instead of having a MATLAB function responsible for executing the controller logic, the MATLAB function takes parameters from the system and uses them to compute the inputs for the RL agent training: observation assignment, the reward function and the criteria for determining the end of an episode. The output of the MATLAB function is then forwarded to a pre-made Simulink box which is responsible for feeding the observations, reward and completion check to an RL agent which has been created in the workspace.

The environment is set to be the Simulink model. The model is a non-linear, dynamic model (projectile dynamics) of the form $\dot{\vec{x}}=f(\vec{x}(t), \vec{u}(t), t)$, with system motion $\vec{x}$ in terms of system states $\vec{x}(t)$ and measurable inputs $\vec{u}(t)$, as described by M. Costello and A. Peterson, "Linear Theory of a Dual-Spin Projectile in Atmospheric Flight," Journal of Guidance, Control, and Dynamics, vol. 23, no. 5, September-October, 2000, incorporated in entirety herein by reference. See also R. L. McCoy, Modern Exterior Ballistics: The Launch and Flight Dynamics of Symmetric Projectiles. Schiffer Publishing, 1999 and S. Theodoulis, V. Gassmann, P. Wernert, L. Dritsas, I. Kitsios, and A. Tzes, "Guidance and Control Design for a Class of Spin-Stabilized Fin-Controlled Projectiles," Journal of Guidance, Control, and Dynamics, vol. 36, no. 2, 2013, incorporated in entirety herein by reference. The model includes a set of equations describing the kinematic and dynamic motion of the projectile, as understood by the skilled person. The model includes various aerodynamic coefficients corresponding to the external forces acting upon the projectile in flight, which may either be obtained from existing databases or simulated using computational fluid dynamics (CFD) analysis. The number of observations with their upper and lower bounds are set. The number of actions is defined with the allowed values, which are taken from the output of the dynamics box. A reset function is also defined, which sets initial conditions of the observations for the simulation; these can either be randomised or fixed. Before the training begins, the parameters of the actor and critic neural networks are defined, with the number of hidden and active layers, their types (e.g. ReLU Layer), and the paths between them. DQN agent parameters are configured, including the discount factor $\gamma$. In any implementation described in the coming analysis, a full description of the neural network parameters will be given.

The agent training options are configured, such as maximum number of episodes, steps per episode and the reward threshold at which the training is terminated. The agent is trained in the defined environment using the set parameters and the resulting trained agent is saved to by implemented by a controller in any environment.

In more detail, Algorithm 1 shows how MATLAB updates the neural networks for each episode:

---

Algorithm 1: Step algorithm for actor/critic update

---

Ensure: Critic Q(s, a) is initialised with parameter values $\theta_Q$, then the target critic is initialised with the same parameter values: $\theta_{Q'} = \theta_Q$
  At each time step:
    1: if RAND > $\epsilon$ then
    2: Given the current observation S, select a random action A with probability $\epsilon$
    3: else
    4: Select and action for which the critic value function is greatest e.g. A = max$_A$|Q(S, A|$\theta_Q$)|
    5: end if
    6: Execute action A and observe the reward R and next observation S'
    7: Store the combined experience S, A, R, S' in the buffer
    8: Sample a random batch of M experiences, S$_i$, A$_i$, R$_i$, S'$_i$
    9: if S'$_i$ is a terminal state then
    10: Set the value function target to be the current reward y$_i$ = R$_i$.
    11: else
    12: Set the value function target to be: y$_i$ = R$_i$ + $\gamma$max$_{A'}$|Q(S'$_i$, A'|$\theta'_Q$)|
    13: end if
    14: Update the critic parameters by minimising the loss L across the M sampled experiences: $L = \frac{1}{M}\sum_{i=1}^{M}(y_i - Q(S_i, A_i|\theta_Q))^2$ 15: Update the target critic periodically: $\theta_{Q'} = \theta_Q$
    16: Update $\epsilon$ for selecting a random action.

---

DQN Direct Control

A DQN agent may be used to control every aspect of the system. The actuation mechanisms described above, responsible for converting the bias points $\phi_{ON}$, $\phi_{OFF}$ to either a latax or $\Delta V$, will be combined with the GL. The DQN agent will have direct control over whether the projectile is in the biased or natural state and will be responsible for taking all simulation parameters into account to produce a desirable approach to the target. In essence, the DQN agent will be controlling a fixed magnitude force vector rotating clockwise at the two selectable speeds, $\omega_0$ and $\omega_B$. This is the most complex application of AI to the considered system.

Figure 8:
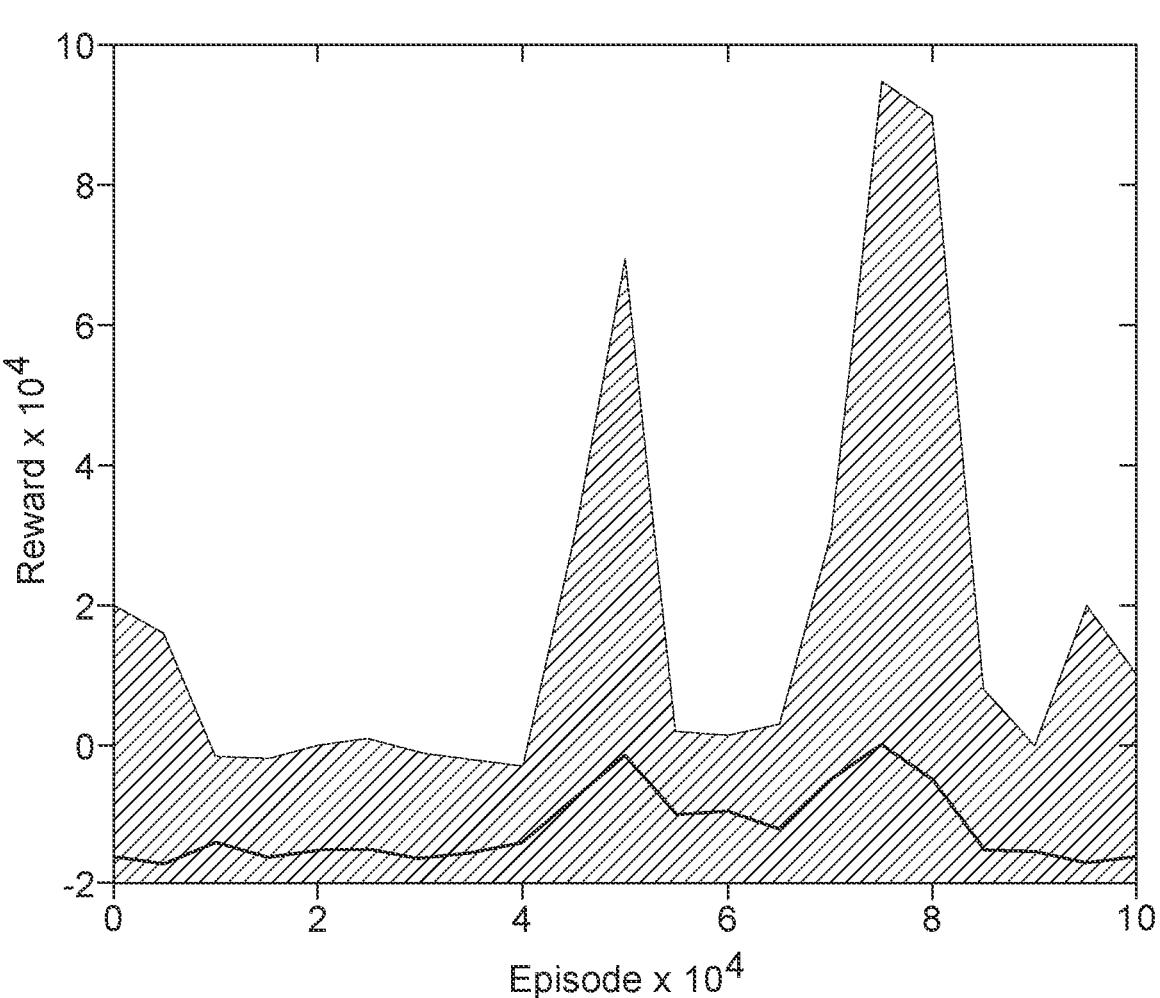
FIG. 8 shows training for the first $1 \times 10^5$ episodes of the implementation test using a DQN agent.

A full list of the training parameters for the neural network, simulation and training are shown in Table 2. Both the target and projectile have no initial velocity and they are initialised at the same point every episode. The positions can then be randomised to continue the training if the agent shows improvement. The observations are distance d, closing velocity $\dot{d}$, target bearing from projectile $\phi_T$ and current roll angle of control force $\phi$. FIG. 8 shows the training results for the first batch of training episodes.

TABLE 2

Training parameters for the neural
network, simulation and training.

| | Value |
|---|---|
| Training parameter | |
| Maximum Episodes | 200,000 |
| Max Steps per Episode | 1000 |
| Episode termination | t > 100 or d > 12 |
| Reward value to terminate | 20,000 |
| Observations | $[d, \dot{d}, \psi]$ |
| Actions | $\omega = \omega_0$ or $\omega_B$ |
| Neural Network configuration | |
| Discount factor $\gamma$ | 0.99 |
| MiniBatchSize | 256 |
| ExperienceBufferLength | $10^5$ |
| TargetUpdateFrequency | 4 |
| Episode Initial conditions | |
| $\omega_0$ | $2\pi$ |
| $\omega_B$ | $\pi/2$ |
| $x_0, y_0$ | (2, 2) |
| $u_0, v_0$ | (0, 0) |
| $\phi_0$ | 0 |
| $xT_0, yT_0$ | (0, 0) |
| $uT_0, vT_0$ | (0, 0) |

The agent did not show any significant development in controlling both the actuator mechanism and the GL as a whole. There was a significant improvement in reward at episodes $5\times10^4$ and $8\times10^4$, but the agent did not retain significant knowledge of the gained experience to capitalise on this reward increase. The fact that the increase in reward was only temporary, and that it did not lead to any permanent performance increase, indicates the surge was likely caused by the agent exploring the action space. In addition, it is a characteristic trait of under-training, where there is not a sufficient action space to map all possible system states which in the environment considered above, is very large due to it being near-continuous. Since the initial conditions for this simulation were held constant, it is likely that in this configuration, the agent was unable to learn the system to a degree that it could effectively enact control. It may be possible for the agent to learn the system if the agent is trained for longer, using a neural network with more nodes and layers. This allows the agent to explore a larger action space, mapping the actions to desirable outcomes. The larger number of nodes and layer in the neural network also means the agent will not be under-trained.

Another possible change that could be made to improve training success and times is to discretise the observation space. Consider that the current target bearing $\phi_T$ is continuous $\in[0,2\pi]$ at least to within the bounds of machine and rounding errors in MATLAB. Instead of feeding this raw data to the agent it could be categorised such that $\phi_T$ is binned in 10 degree increments. This reduces the observation space from being effectively continuous to having 36 finite possibilities, making it much more efficient to map every possible system state to an action. While this will reduce the precision and fidelity of the action system it will return some performance by the agent to ascertain whether this method of complete control is viable. There could be either some secondary architecture which allows further control fidelity within these bins, or the agent could be retrained with a more continuous or less discretised environment.

DDPG Guidance Law

While the DQN agent described in the previous sections is capable only of finite actions, a Deep Deterministic Policy Gradient (DDPG) has a continuous action space. Different implementation methods must be used to accommodate the continuous action space of the DDPG agent. Whereas the DQN agent used above was responsible for both the actuation mechanism and the GL, the DDPG implementation will be constructed so it is responsible for only one or the other. In this implementation, a DDPG agent is used to create a GL which dictates the trajectory of the projectile on approach to the target, by demanding a latax.

A key difference must be made to the neural network when using a DDPG agent as opposed to a DQN. The output of action layer in the DQN network was a binary 0 or 1, depending on what the weighting activation of the layer decided.

The output of a DDPG action layer is continuous in the range $A\in[-\infty, \infty]$, but this is well outside the range of the latax which can be demanded of the projectile, due to saturation of the actuation mechanism. To account for this, a tanh layer is used to map the action range to $A\in[-1,1]$. This is then also passed through a scaling layer, so that the action which is actually fed to the actuation mechanism is $A\in[-\tilde{a}_{max}, \tilde{a}_{max}]$.

Figure 9:
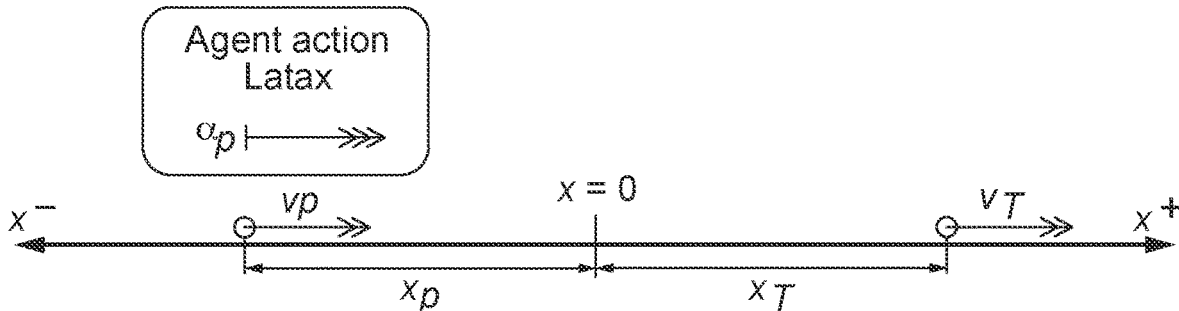
FIG. 9 schematically depicts a 1D latax problem.

Guidance laws usually demand latax both horizontal and normal to the projectile travel, though sometimes they may demand purely a lateral acceleration. In this sense, they are dual-channel, where each channel represents the acceleration normal and lateral to the longitudinal velocity of the direct fire projectile. While the implementation of the DQN agent above encompassed actuator control and dual-channel latax, the operation and output of the agent doesn't necessarily have to cover both channels. Much like conventional Cartesian control, the agent can have full control over a single channel and two of them can be used in combination, to generate the final signal sent to the projectile. In this sense the agent can be trained in a 1D environment, which is shown in FIG. 9. Two point masses of m=1, the projectile and target are free to move along a generic 1D axis with distances from the origin being xp and x respectively. Both have respective speeds of $v_P$ and $v_T$ directed solely along this axis. The DDPG agent is responsible for issuing an acceleration command to the point mass projectile.

Table 3 shows the model parameters for the training. The agent is trained using the reward function described previously. Notable differences are that the episode will be prematurely terminated depending on the single axis distance $x_T-x$ not the 2D radial distance d. This means the termination distance in the reward function becomes $d_T=x_T=50$. Likewise the observations have been reduced to simply the 1D equivalents, $(d, \dot{d})\rightarrow(x, \dot{x})$. As mentioned, the agent action is no longer controlling the bias points, but the acceleration demand of the projectile. The action space is a single latax demand $A=a_x\in[-\tilde{a}_{max}, \tilde{a}_{max}]$, mapped into this range from $[-\infty, \infty]$ using the tanh layer.

| | Value |
|---|---|
| Training parameter | |
| Maximum Episodes | 200,000 |
| Max Steps per Episode | 1000 |
| Episode termination | t > 50 or x > 50 |
| Reward value to terminate | 20,000 |
| Observations | x and $\dot{x} = u_x$ both $\in [-\infty, \infty]$ |
| Actions | $a_x \in [-\tilde{a}_{max}, \tilde{a}_{max}]$ |
| Neural Network configuration | |
| Discount factor $\gamma$ | 0.99 |
| MiniBatchSize | 256 |
| ExperienceBufferLength | $10^5$ |
| TargetUpdateFrequency | 4 |

-continued

| | Value |
|---|---|
| Episode Initial conditions | |
| $x_0$ | [−10, 10] |
| $u_0$ | [−10, 10] |
| $xT_0$ | [−10, 10] |
| $uT_0$ | [−10, 10] |

Figure 10:
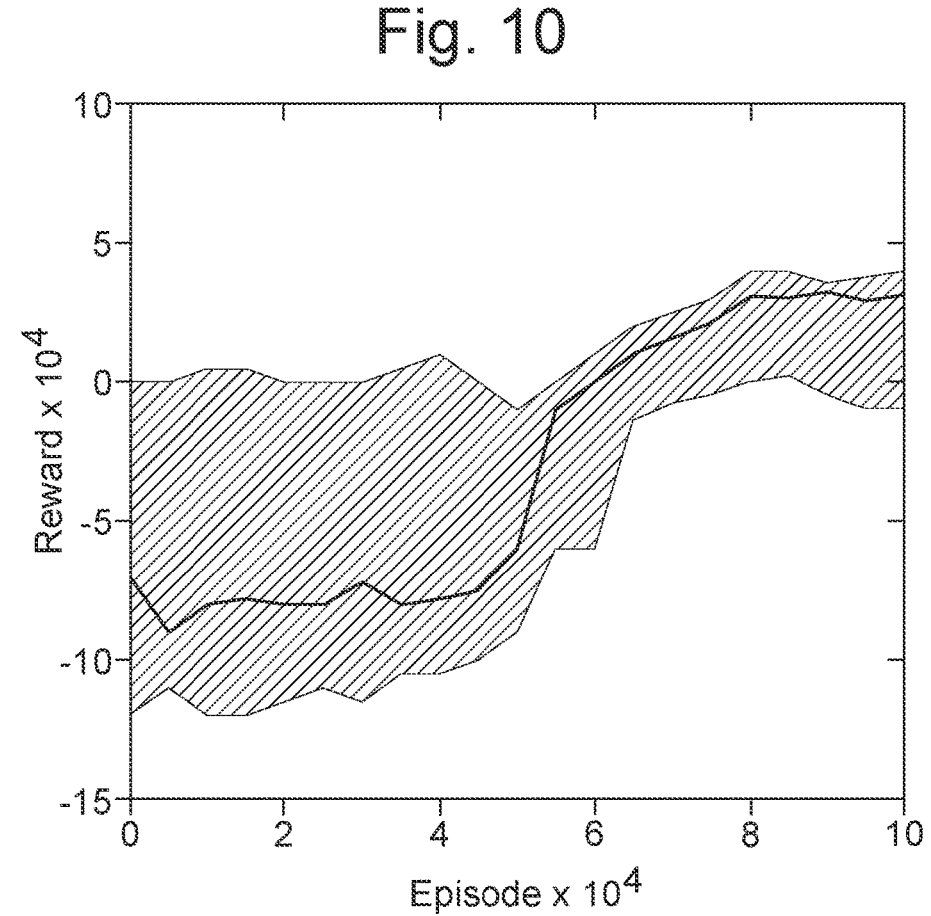
FIG. 10 is a graph of reward as a function of episode for training for basic 1D control model.

FIG. 10 shows the training data for the DDPG agent in the 1D latax control system. There is an obvious disparity between episodes which were terminated early due to too great a miss distance, and the episodes which had a poor performance. Around the 3000th episode, the agent was capable of preventing the early termination of the episodes. A reward of between −300 and 0 indicates an episode wasn't a failure, but also that the agent was not sufficiently reducing the error to increase the reward. By episode 7000, the agent could reliably reduce the error to within the accuracy bound demanded. In the last 3000 episodes, the agent steadily improved performance to a mean reward of $3 \times 10^4$.

Figure 11:
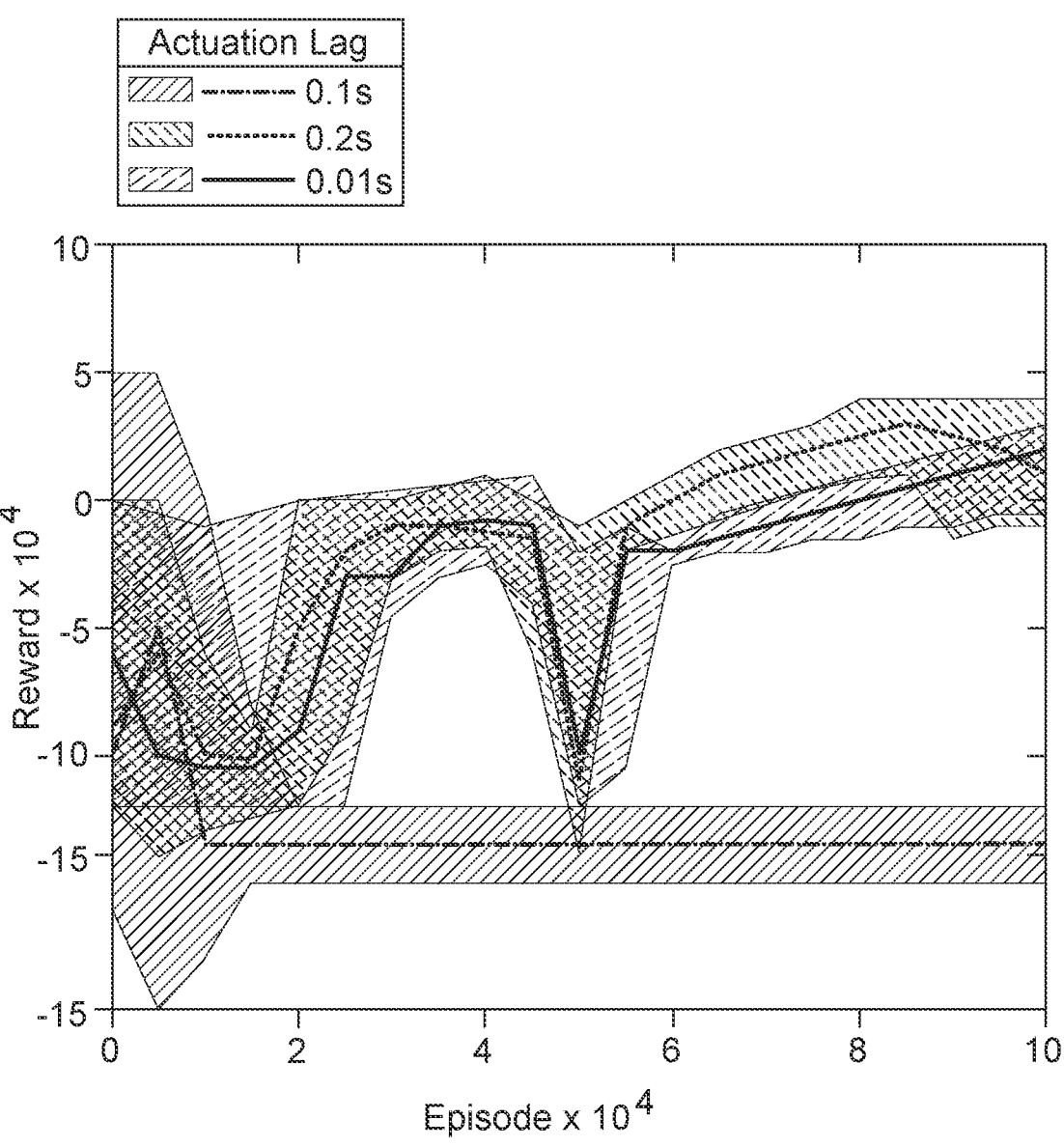
FIG. 11 a graph of reward as a function of episode for training for single channel environment and actuator lags.

Since the agent was able to control the 1D dynamic system with the neural network configuration additional complications can be made. The primary change the novel actuation mechanism faces in comparison to a traditional point mass model is the lag of the system in achieving the desired control variable. As such, an actuator lag is added to emulate the delay in system response caused by the projectile needing to complete one full rotation before enacting the command of the GL. The delay is modelled by a simple time-based signal delay block in Simulink, which holds a given signal by a predetermined amount of time, before passing it along. In this way, the agent is still receiving valid information about the state of the system, it merely must learn that the actions it takes are not immediately executed. There is also no dynamic noise which goes unobserved, causing perturbations which could not be perceived by the agent. The signal delay, or actuator lag, is set to 0.1, 0.02 and 0.01 seconds; since the agent sample time $T_A$ is 0.1 s these actuator lags correlate to $T_A$, $T_A/5$ and $T_A/10$ respectively. FIG. 11 shows the training data for agents with different levels of actuator lag.

FIG. 11 shows that for both delay times of 0.01 s and 0.02 s, the agent is capable of learning actions which substantially increase the episode reward. For a 0.1 s delay, the agent was unable to learn desirable actions as defined by the reward function. It should be noted that the agent may eventually have been able to learn the environment given sufficiently more episodes with the current network configuration. However, project constraints must be set somewhere and the results presented in the figure show that the capability is present within a suitable training time. Such neural-network optimisations should be considered during any higher TRL implementation, but are outside the scope of this project.

Figure 12:
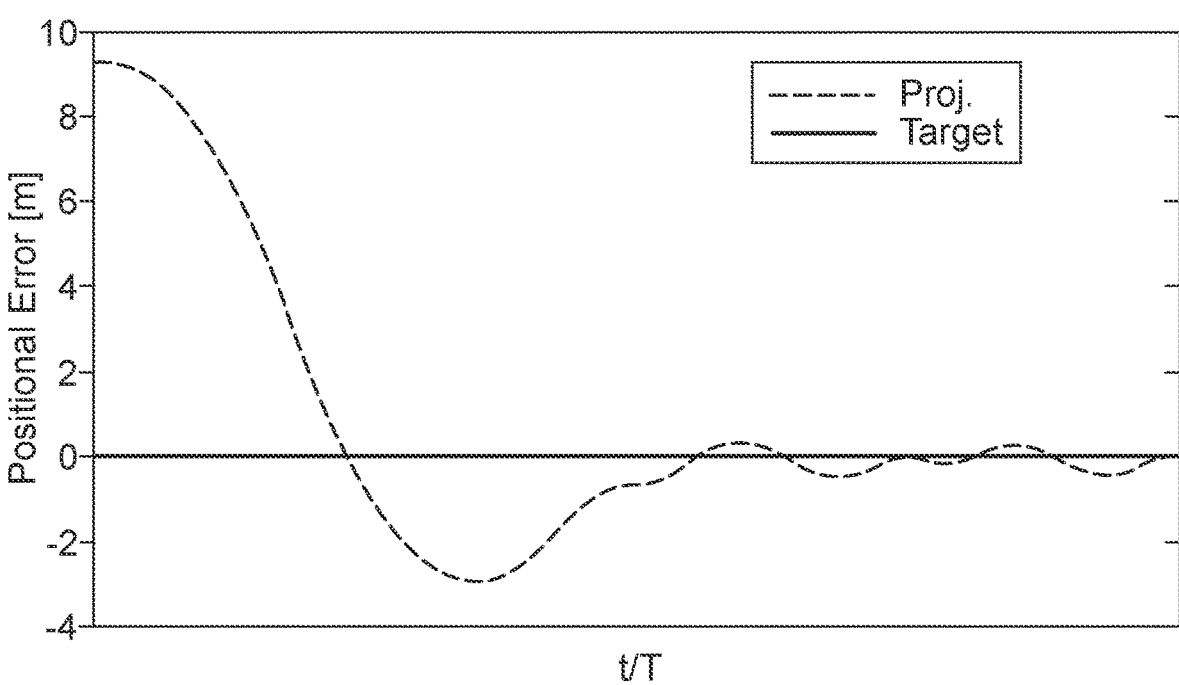
FIG. 12 is a graph of positional error as a function of time, showing performance trajectory for trained agent with 0.02 s actuator lag.

FIG. 12 shows the performance of the agent with a 0.02 s actuator lag after the $10^5$ episodes of training from FIG. 11. The DDPG based GL visibly reduces the miss distance of the projectile and is able to hold in an effort to reduce the steady state error.

Figure 18A:
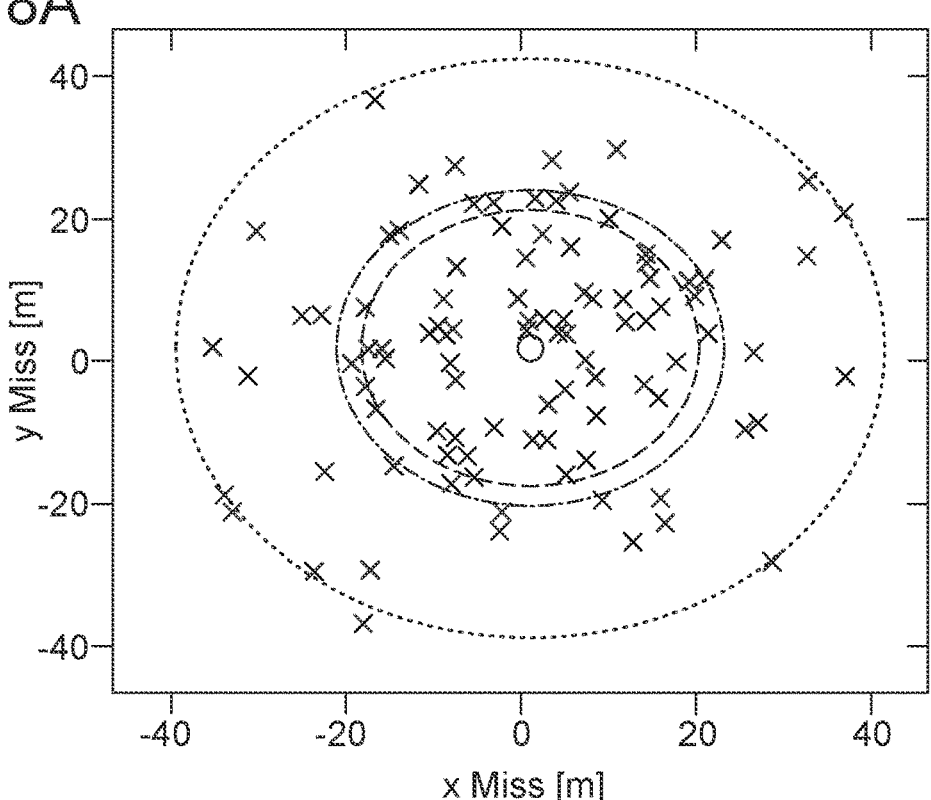
FIG. 18A is a graph of terminal dispersion for projectiles according to a conventional ballistic guidance law.
Figure 18B:
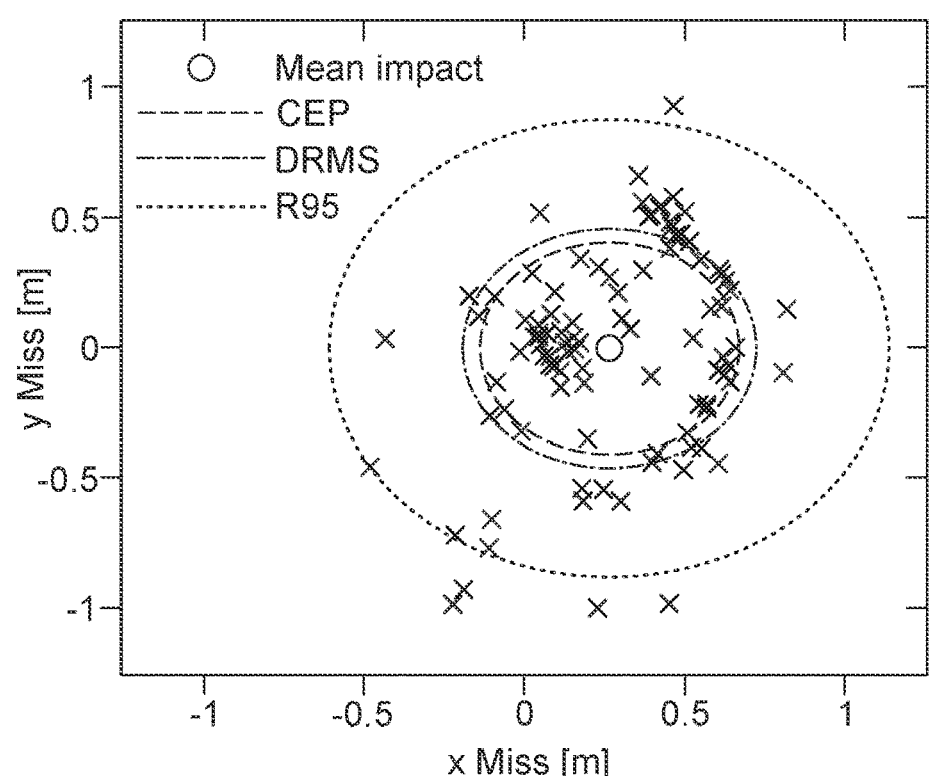
FIG. 18B is a graph of terminal dispersion for projectiles controlled according to an exemplary embodiment.

FIG. 18A is a graph of terminal dispersion for projectiles according to a conventional ballistic guidance law (in which the controller is switched off and the projectile trajectory evolves according to the initial conditions); and FIG. 18B is a graph of terminal dispersion for projectiles controlled according to an exemplary embodiment. In more detail, FIGS. 18A and 18B show 100 impacts from each of the guidance laws, selected at random from the $10^5$ runs. N.B. no impact points are covered by the legend. All 100 impacts that were selected from the set are shown on the figures, there were no impact points extreme enough to warrant exclusion from the plots. There are few highly dense impact points, which would indicate a bias in the GLs towards specific locations in space. AI appears to show a circular dense region of impacts centred directly over the target at (0,0), in addition to a semicircular cluster along the right side of the CEP and DRMS circumferences. Further statistical data analysis will confirm whether or not the bias is significant. All guidance laws implemented under these nominal simulation conditions provided satisfactory levels of dispersion correction. Table 4 summarises dispersion measurements for ballistic and AI control for the $10^5$ runs. CEP is the most commonly used metric across both the academic and industrial fields of ballistics. The CEP is reduced from 19.25 m for the ballistic model to just 0.404 m for the AI control.

TABLE 4

Dispersion measurements for nominal system: circular error probability (CEP); Distance Root Mean Squared (DRMS) which includes 63.21% (or 2σ); and R95 which includes 95%.

| Guidance Law | CEP (m) | DRMS (m) | R95 (m) |
|---|---|---|---|
| Ballistic | 19.25 | 22.13 | 40.52 |
| AI | 0.404 | 0.457 | 0.874 |

Figures 19, 20:
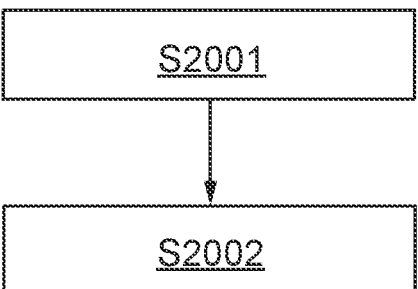
FIG. 19 schematically depicts a method according to an exemplary embodiment.
FIG. 20 schematically depicts a method according to an exemplary embodiment.

FIG. 19 schematically depicts a method according to an exemplary embodiment. The method is a computer-implemented method of training a machine learning, ML algorithm to control spin-stabilized steerable projectiles. At S2001, the method comprises obtaining training data including respective policies and corresponding trajectories of a set of spin-stabilized steerable projectiles including a first projectile, wherein each policy relates to steering a projectile of the set thereof towards a target and wherein each corresponding trajectory comprises a series of states in a state space of the projectile. At S2002, the method comprises training the ML algorithm comprising determining relationships between the respective policies and corresponding trajectories of the projectiles of the set thereof based on respective results of comparing the trajectories and the targets. The method may include any of the steps described herein, for example with respect to the first aspect, the third aspect and/or the exemplary embodiments.

FIG. 20 schematically depicts a method according to an exemplary embodiment. The method is a computer-implemented method of controlling a spin-stabilized steerable projectile. At S2101, the method comprises controlling, by a trained machine learning, ML, algorithm, the projectile according to a policy, comprising steering the projectile of the set thereof towards a target. The method may include any of the steps described herein, for example with respect to the first aspect, the second aspect, the third aspect, the fourth aspect and/or the exemplary embodiments.

Projectile

Figure 13:
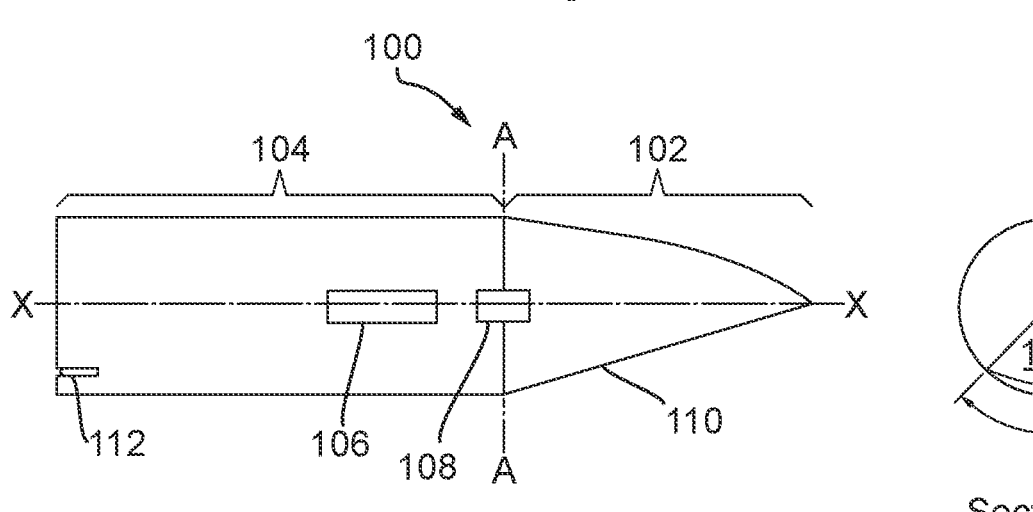
FIG. 13 schematically depicts a projectile according to an exemplary embodiment.

FIG. 13 schematically depicts a projectile 100 comprising: a front ogive section 102, an aft section 104; and a command module 106; wherein the front ogive section 102 is rotatably connected to the aft section 104 by a coupling device 108, the front ogive section 102 further comprising an asymmetric surface 110, where in use, the angular rotation of the front ogive section 102 can be selectively adjusted relative to the aft section 104 by commands from a command module 106 to the coupling device 108, such that the asymmetric surface 110 exerts an imbalance upon the projectile to selectively alter the trajectory of said projectile, and thereby steer and course correct the projectile.

In this example, the projectile is a gun launched projectile, such as a medium calibre shell wherein the front ogive section 102 and aft section 104 are made from steel. For simplicity, features such as fuzes, driving bands, and other typical features are not shown.

In this example, the coupling device 108 is an active coupling device in the form of a servo motor. The servo motor allows both clockwise and anticlockwise rotation of the front ogive section 102 with respect to the aft section 104.

In this example, the projectile rotates about axis X.

In this example, the projectile comprises an electrical slip ring (not shown) between the front ogive section 102 and the aft section 104.

In this example, the asymmetric surface 110 is an aerodynamic lifting surface, specifically a truncated ogive. Said asymmetric surface extends α°, in this example 90°, around the plane face of the projectile as seen in Section A-A.

In this example, the projectile 100 comprises a continuous surface such that the outer profile of the projectile 100 is smooth blended surface absent from protruding fins or protruding control surfaces.

In this example, the projectile may comprise a receiver for receiving guidance instructions from an external targeting system in the form of an optical receiver 112. Said optical receiver 112 is in communication with the command module 106 and is a beam rider receiver such that the optical receiver senses the intensity of a guidance laser (not shown) wherein the command module 106 is configured to detect drift of the laser focus from the optical receiver 112 wherein the command module 106 issues commands to the coupling 108 in order to remain on the laser path.

Figure 14:
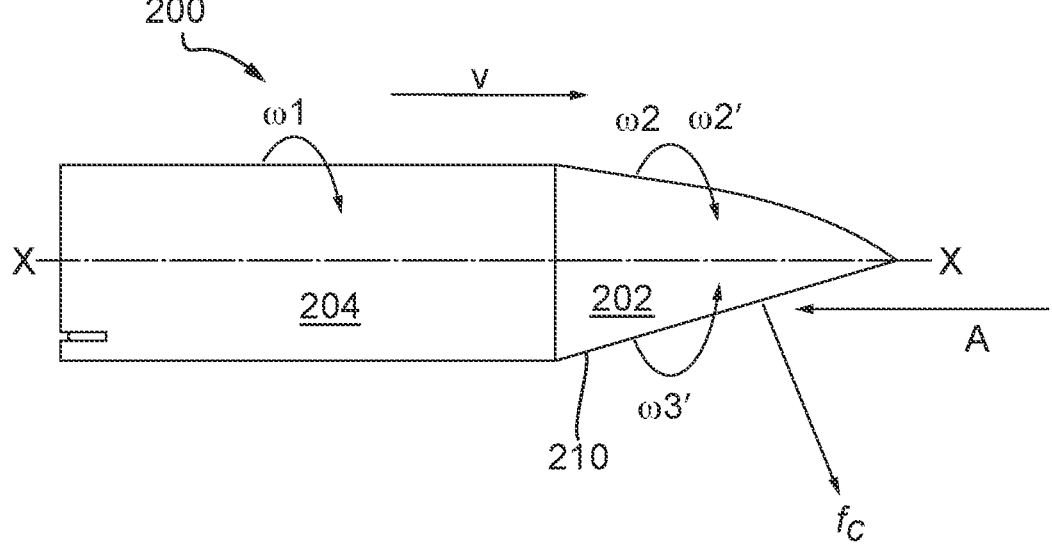
FIG. 14 schematically depicts a force diagram of the projectile of FIG. 1.

FIG. 14 schematically the projectile of FIG. 1 as a force diagram. The projectile 200 comprising both front ogive section 202 and aft section 204 travelling at velocity v. In this arrangement the projectile is fired from a rifled barrel, the aft section 204 and ogive 202 both rotate at the same clockwise angular rotation ω1 & ω2 respectively against oncoming airflow A. The oncoming airflow A is deflected by the asymmetric surface 210 to create a first imbalanced force vector $F_c$ on the projectile.

On command of the command module (not shown), the servo motor changes the rate of angular rotation of the ogive 202, to either a reduced clockwise ω2' angular rotation rate or an anticlockwise ω3' with respect to the aft section 204 which continues to rotate at angular speed ω1 thereby creating a second imbalanced force vector $F_c$ on the projectile, i.e. altering the angle of the force vector $F_c$ about the axis X.

Alternatively, the coupling device may be a passive coupling device in the form of a brake. The brake can be selectively braked and un-braked to uncouple the front ogive section from the aft section thus allowing the front ogive section to slow due to an aerodynamic roll damping moment.

Figure 15A:
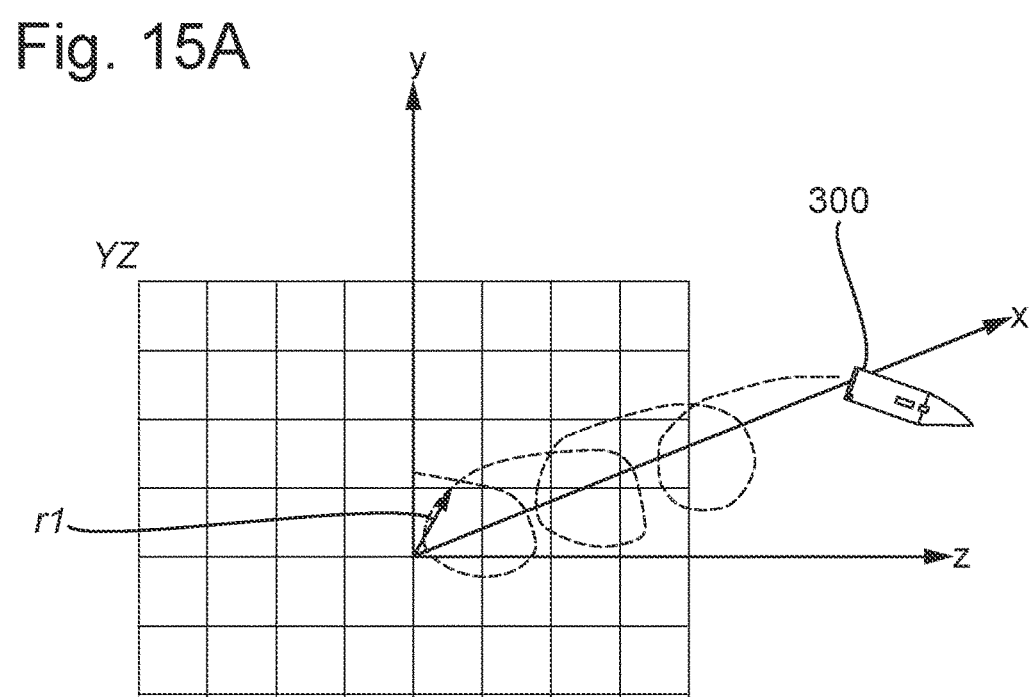
FIGS. 15A and 15B schematically depict a helix trajectory plot of a rifled projectile.
Figure 15B:
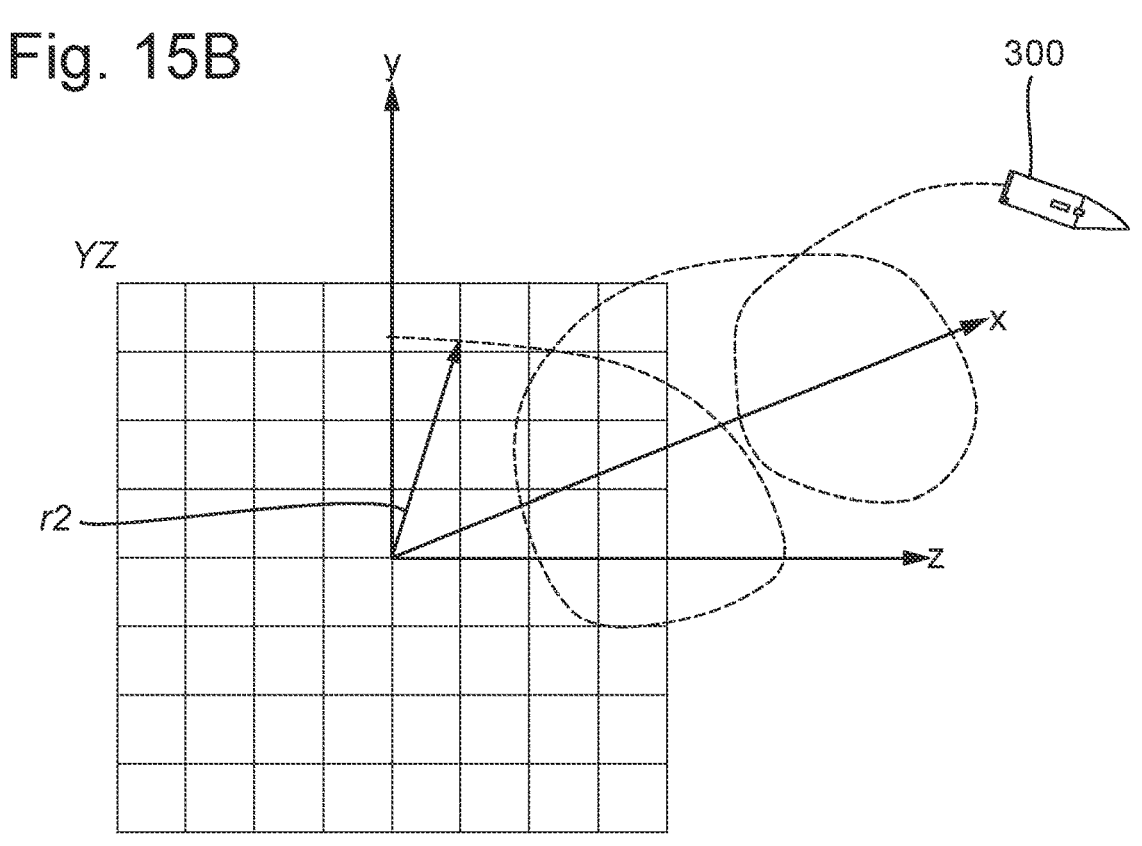

FIGS. 15A and 15B schematically depict a projectile 300, as described with the projectile 100 of FIG. 13, travelling in a helical path substantially along the axis x after firing from a rifled barrel.

In FIG. 15A, the front ogive section and aft section are in the coupled mode, i.e. both sections spin at the same angular rotation, the helix radius is r1 on the superimposed YZ plane.

In FIG. 15B, the front ogive section and aft section are in the decoupled mode, i.e. the front ogive section is spinning at a different angular rotation compared to the aft section, the helix radius is r2 on the superimposed YZ plane, wherein radius r2 is greater than radius r1. The control force from the aerodynamic surfaces on the ogive act in a tangential direction for longer, resulting in a larger radial acceleration. The projectile thus travels further radially before the control force rotates to oppose the motion. The result is that in the decoupled state, the trajectory forms a larger helix r2 diameter than in the coupled mode r1. When the command module calculates that the projectile is on trajectory to hit the intended target, the front ogive section and aft section re-couple such that the front ogive section is restored to the spin rate of the faster spinning aft section thus returning to a helix radius r1 as shown in FIG. 15A.

Figure 16:
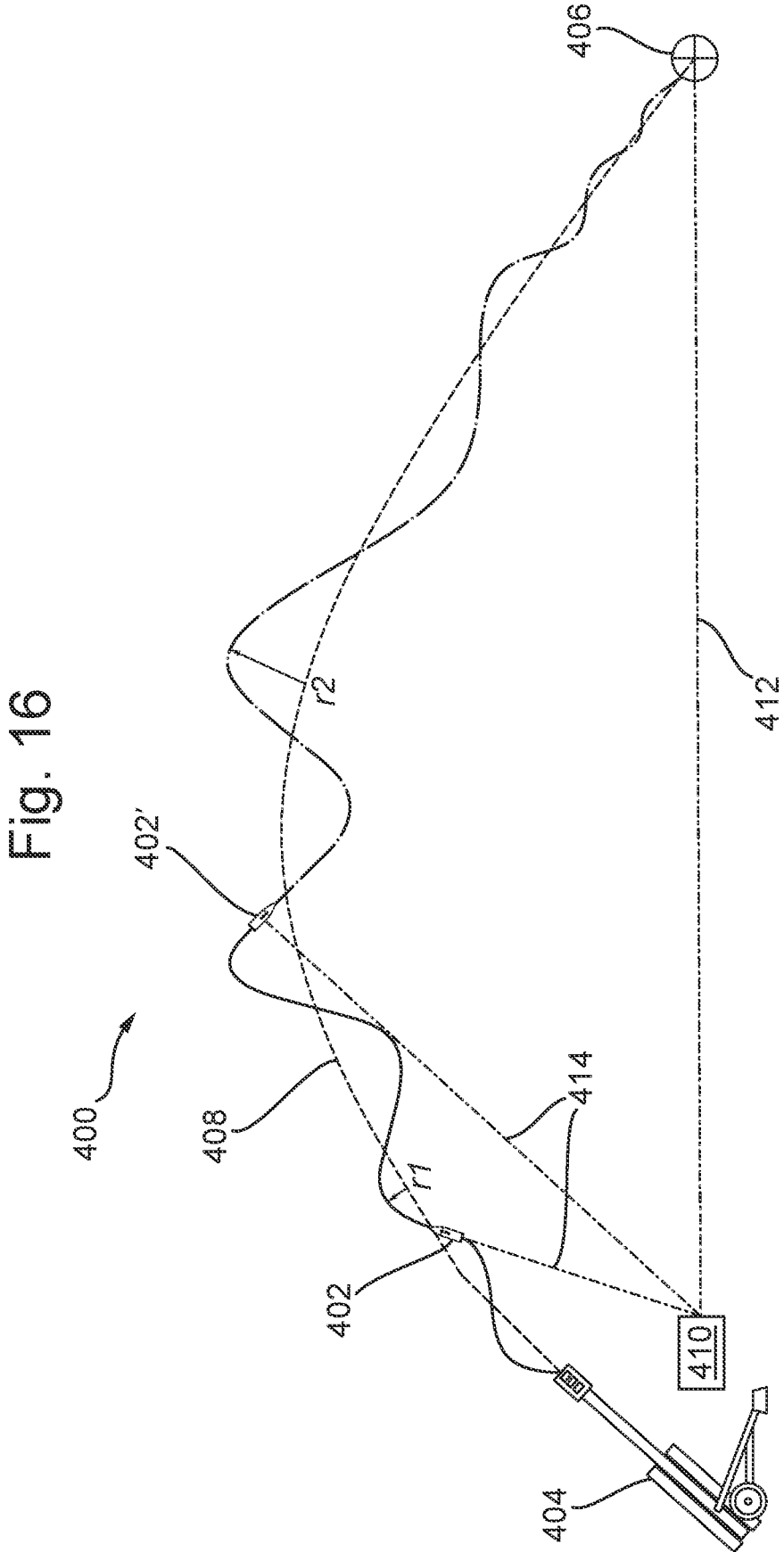
FIG. 16 schematically depicts a system of a rifled projectile fired from an artillery gun according to an exemplary embodiment.

FIG. 16 schematically depicts a system 400 for controlling a projectile, the system comprising a projectile 402 as shown in FIG. 13 fired from a rifled artillery gun 404 towards a target 406 along a nominal trajectory 408. After firing, the coupling device of projectile 402 is coupled such that the front section spins at the same angular rotation as the aft section, the projectile travelling in a first helical trajectory with radius r1. Later in flight, the projectile 402' coupling device is decoupled, the front section spins at a different angular rotation relative to the aft section, the projectile travelling in a second helical trajectory with radius r2, wherein the first helical radius r1 is smaller than the second helical radius r2, thereby enabling the projectile 402 to be steered to the target 406.

In this example, there is provided an external targeting system in the form of a laser designator 410. Said laser designator is trained on the target 406 by beam 412. The laser designator in optical communication with the projectile 402 comprising an optical receiver on the projectile via optical signals 414.

Figure 17:
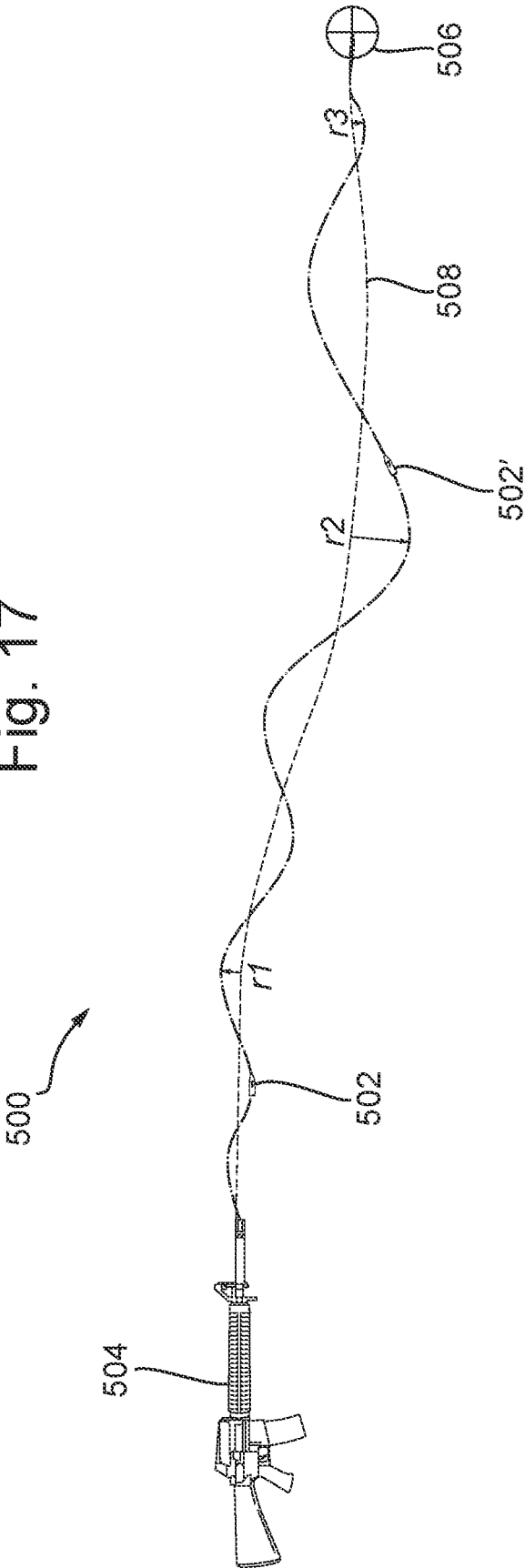
FIG. 17 shows a system of a rifled projectile fired from a hand held weapon according to an exemplary embodiment.

FIG. 17 schematically depicts a system for controlling a projectile 500, the system comprising a projectile 502. In this example, said projectile 502 is a small arms calibre bullet fired from a rifle 504 towards a target 506 along a nominal trajectory 508. After firing, the coupling device of projectile 502 is coupled such that the front section spins at the same angular rotation as the aft section, the projectile travelling in a first helical trajectory with radius r1.

Later in flight, the projectile 502' coupling device is decoupled, the front section spins at a different angular rotation relative to the aft section, the projectile travelling in a second helical trajectory with radius r2, wherein the first helical radius r1 is smaller than the second helical radius r2. The second helical radius corrects the projectile flightpath such that the projectile is on a trajectory which will hit the target 506 wherein the front ogive section couples with the aft section to travel in a third helical trajectory with radius r3, wherein the third helical radius is smaller than radius r2, thereby enabling the projectile 502 to be steered to the target 506. The projectile is further able to couple and decouple multiple times during flight to switch between larger and smaller helical trajectories in order to correct the trajectory to target 506.

In this example, there is provided an internal guidance system within the command module (not shown) of the projectile 502 in the form of an accelerometer and gyroscope wherein the projectile can inherently calculate its position and issue instructions to the coupling device to guide the projectile 502 to the target 506 without reference to an external targeting system.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A computer-implemented method of training a machine learning, ML algorithm to control spin-stabilized steerable projectiles, the method comprising:
receiving training data including respective policies and corresponding trajectories of a set of spin-stabilized steerable projectiles, wherein each respective policy relates to steering a projectile of the set towards a target of one or more targets, and wherein each corresponding trajectory comprises a series of states in a state space of the projectile; and
training the ML algorithm comprising determining relationships between the respective policies and corresponding trajectories of the projectiles of the set based on respective results of comparing the trajectories and the one or more targets.

2. The method according to claim 1, wherein the series of states includes finite states of the projectile.

3. The method according to claim 1, wherein steering the projectile towards the target comprises actioning state transitions of the projectile.

4. The method according to claim 1, wherein each corresponding trajectory comprises a series of portions correlating with the series of states.

5. The method according to claim 1, wherein comparing the trajectories and the targets comprises determining accuracies and/or precisions of the trajectories with respect to the targets.

6. The method according to claim 1, comprising programmatically generating the projectiles.

7. The method according to claim 1, comprising measuring the trajectories.

8. The method according to claim 1:
wherein the ML algorithm comprises and/or is a reinforcement learning, RL, agent; and
wherein training the ML algorithm comprises training the agent, comprising:
(a) actioning, by the agent, a given projectile of the set according to a respective policy, wherein the policy is of an action space of the agent, comprising steering the given projectile towards a target, thereby defining a corresponding trajectory comprising a series of states in a state space of the given projectile and thereby obtaining respective training data;
(b) determining a relationship between the policy and the trajectory based on a result of comparing the trajectory and the target and updating the policy based on the result; and
(c) repeating steps (a) and (b) for the set of projectiles, using the updated policy.

9. A computer-implemented method of controlling a fired spin-stabilized steerable projectile, the method comprising:
controlling, by a machine learning, ML, algorithm trained according to claim 1, the fired spin-stabilized steerable projectile according to a policy, comprising steering the fired spin-stabilized steerable projectile towards a target.

10. The method according to claim 8,
wherein the given projectile comprises a front ogive section, an aft section and a command module in communication with the agent;
wherein the front ogive section is rotatably connected to the aft section by a coupling device and wherein the front ogive section comprises an asymmetric surface; and
wherein angular rotation of the front ogive section is selectively adjustable relative to the aft section by commands from the command module, responsive to the agent, to the coupling device, whereby the asymmetric surface exerts an imbalance upon the given projectile to control the trajectory of the given projectile.

11. The method according to claim 10, wherein the given projectile is arrangeable in:
a first arrangement, wherein the coupling device is coupled, whereby the front ogive section spins at the same angular rotation as the aft section and wherein the given projectile travels in a first helical trajectory; and
a second arrangement, wherein the coupling device is decoupled, whereby the front ogive section spins at a different angular rotation relative to the aft section and wherein the given projectile travels in a second helical trajectory, wherein first helical trajectory comprises a smaller radius than the second helical trajectory;
wherein the first arrangement and the second arrangement are respectively represented by a first state and a second state in the state space of the given projectile.

12. A system comprising a steerable projectile and a computer, the system comprising:
a processor and a memory; and
a machine learning, ML, algorithm trained according to claim 1, and stored in the memory and executable by the processor;
wherein the projectile comprises a front ogive section, an aft section and a command module communicable with a trained machine learning, ML, algorithm;
wherein the front ogive section is rotatably connected to the aft section by a coupling device and wherein the front ogive section comprises an asymmetric surface; and wherein angular rotation of the front ogive section is selectively adjustable relative to the aft section by commands from the command module, responsive to the trained ML algorithm, to the coupling device, whereby the asymmetric surface exerts an imbalance upon the projectile to control the trajectory of the projectile.

13. The system according to claim 12, comprising a targeting system.

14. A non-transient computer-readable storage medium comprising instructions which, when executed by a computer comprising a processor and a memory, cause the computer to perform a process for training a machine learning, ML algorithm to control spin-stabilized steerable projectiles, the process comprising:

receiving training data including respective policies and corresponding trajectories of a set of spin-stabilized steerable projectiles, wherein each respective policy relates to steering a projectile of the set towards a target of one or more targets, and wherein each corresponding trajectory comprises a series of states in a state space of the projectile; and training the ML algorithm comprising determining relationships between the respective policies and corresponding trajectories of the projectiles of the set based on respective results of comparing the trajectories and the one or more targets.

15. The non-transient computer-readable storage medium according to claim 14, wherein:

the series of states includes finite states of the projectile;

steering the projectile towards the target comprises actioning state transitions of the projectile;

each corresponding trajectory comprises a series of portions correlating with the series of states; and/or comparing the trajectories and the targets comprises determining accuracies and/or precisions of the trajectories with respect to the targets.

16. The non-transient computer-readable storage medium according to claim 14, the process comprising:

programmatically generating the projectiles; and/or measuring the trajectories.

17. The non-transient computer-readable storage medium according to claim 14, wherein the ML algorithm comprises and/or is a reinforcement learning, RL, agent, and wherein training the ML algorithm comprises training the agent, the process comprising:

(a) actioning, by the agent, a given projectile of the set according to a respective policy, wherein the policy is of an action space of the agent, comprising steering the given projectile towards a target, thereby defining a corresponding trajectory comprising a series of states in a state space of the given projectile and thereby obtaining respective training data;

(b) determining a relationship between the policy and the trajectory based on a result of comparing the trajectory and the target and updating the policy based on the result; and (c) repeating (a) and (b) for the set of projectiles, using the updated policy.

18. A system for controlling a fired spin-stabilized steerable projectile, the system comprising: a machine learning, ML, algorithm trained according to claim 14, wherein:

the fired projectile comprises a front ogive section, an aft section and a command module in communication with the trained ML algorithm;

the front ogive section is rotatably connected to the aft section by a coupling device and wherein the front ogive section comprises an asymmetric surface; and angular rotation of the front ogive section is selectively adjustable relative to the aft section by commands from the command module, responsive to the ML algorithm, to the coupling device, whereby the asymmetric surface exerts an imbalance upon the fired projectile to control the trajectory of the fired projectile.

19. The system according to claim 18, wherein:

the fired projectile is arrangeable in a first arrangement, wherein the coupling device is coupled, whereby the front ogive section spins at the same angular rotation as the aft section and wherein the fired projectile travels in a first helical trajectory;

the fired projectile is arrangeable in a second arrangement, wherein the coupling device is decoupled, whereby the front ogive section spins at a different angular rotation relative to the aft section and wherein the fired projectile travels in a second helical trajectory, wherein first helical trajectory comprises a smaller radius than the second helical trajectory; and the first arrangement and the second arrangement are respectively represented by a first state and a second state in the state space of the fired projectile.

20. A non-transient computer-readable storage medium comprising instructions which, when executed by a computer comprising a processor and a memory, cause the computer to perform a process for training a machine learning, ML algorithm to control spin-stabilized steerable projectiles, the process comprising:

receiving training data including respective policies and corresponding trajectories of a set of spin-stabilized steerable projectiles, wherein each respective policy relates to an action for steering a given projectile of the set towards a target, and wherein each corresponding trajectory comprises a series of states in a state space of the given projectile;

actioning, by the ML algorithm, the given projectile of the set according to a respective policy, thereby defining a corresponding trajectory comprising a series of states in a state space of the given projectile and thereby obtaining respective training data;

determining a relationship between the policy and the trajectory based on a result of comparing the trajectory and the target and updating the policy based on the result; and repeating the actioning and determining for the set of projectiles, using the updated policy.

* * * * *